United States Patent
Weng et al.

(10) Patent No.: US 11,768,338 B2
(45) Date of Patent: Sep. 26, 2023

(54) OPTICAL INTERCONNECT STRUCTURE, PACKAGE STRUCTURE AND FABRICATING METHOD THEREOF

(71) Applicant: Taiwan Semiconductor Manufacturing Company, Ltd., Hsinchu (TW)

(72) Inventors: Chung-Ming Weng, Hsinchu (TW); Chen-Hua Yu, Hsinchu (TW); Chung-Shi Liu, Hsinchu (TW); Hao-Yi Tsai, Hsinchu (TW); Cheng-Chieh Hsieh, Tainan (TW); Hung-Yi Kuo, Taipei (TW); Tsung-Yuan Yu, Taipei (TW); Hua-Kuei Lin, Hsinchu (TW); Yu-Hsiang Hu, Hsinchu (TW); Chewn-Pu Jou, Hsinchu (TW); Feng-Wei Kuo, Hsinchu County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/332,988

(22) Filed: May 27, 2021

(65) Prior Publication Data
US 2022/0382004 A1    Dec. 1, 2022

(51) Int. Cl.
*G02B 6/42* (2006.01)
*G02B 6/12* (2006.01)
(Continued)

(52) U.S. Cl.
CPC ....... *G02B 6/4214* (2013.01); *G02B 6/12002* (2013.01); *G02B 6/12004* (2013.01);
(Continued)

(58) Field of Classification Search
None
See application file for complete search history.

(56) References Cited

U.S. PATENT DOCUMENTS 5,263,111 A * 11/1993 Nurse ................. G02B 6/2817
385/130
7,945,131 B1 * 5/2011 Asghari ................. G02B 6/136
385/47

(Continued)

FOREIGN PATENT DOCUMENTS

JP    2013174837 A * 9/2013
KR   2010-0117332 A * 11/2010 ......... G02B 6/12002

OTHER PUBLICATIONS

Lee, Machine Translation of KR 2010-0117332 A, Nov. 2010. (Year: 2010).*

(Continued)

*Primary Examiner* — Michelle R Connelly
(74) *Attorney, Agent, or Firm* — JCIPRNET

(57) ABSTRACT

An optical interconnect structure including a base substrate, an optical waveguide, a first reflector, a second reflector, a dielectric layer, a first lens, and a second lens is provided. The optical waveguide is embedded in the base substrate. The optical waveguide includes a first end portion and a second end portion opposite to the first end portion. The first reflector is disposed between the base substrate and the first end portion of the optical waveguide. The second reflector is disposed between the base substrate and the second end portion of the optical waveguide. The dielectric layer covers the base substrate and the optical waveguide. The first lens is disposed on the dielectric layer and located above the first end portion of the optical waveguide. The second lens is disposed on the dielectric layer and located above the second end portion of the optical waveguide.

20 Claims, 15 Drawing Sheets

(51) Int. Cl.
*G02B 6/136* (2006.01)
*G02B 6/43* (2006.01)

(52) U.S. Cl.
CPC .......... *G02B 6/136* (2013.01); *G02B 6/4203* (2013.01); *G02B 6/4204* (2013.01); *G02B 6/43* (2013.01); *G02B 6/428* (2013.01); *G02B 2006/12102* (2013.01); *G02B 2006/12104* (2013.01)

(56) References Cited

U.S. PATENT DOCUMENTS

| | | | |
|---|---|---|---|
| 9,000,584 | B2 | 4/2015 | Lin et al. |
| 9,048,222 | B2 | 6/2015 | Hung et al. |
| 9,048,233 | B2 | 6/2015 | Wu et al. |
| 9,064,879 | B2 | 6/2015 | Hung et al. |
| 9,111,949 | B2 | 8/2015 | Yu et al. |
| 9,263,511 | B2 | 2/2016 | Yu et al. |
| 9,281,254 | B2 | 3/2016 | Yu et al. |
| 9,316,799 | B2 * | 4/2016 | Shiraishi ............ G02B 6/4245 |
| 9,368,460 | B2 | 6/2016 | Yu et al. |
| 9,372,206 | B2 | 6/2016 | Wu et al. |
| 9,496,189 | B2 | 11/2016 | Yu et al. |
| 2002/0039464 | A1 * | 4/2002 | Yoshimura ............ H01L 24/24 257/E25.032 |
| 2006/0067607 | A1 * | 3/2006 | Fang .................... G02B 6/4204 385/39 |
| 2007/0077008 | A1 * | 4/2007 | Jeon .................... G02B 6/4214 385/39 |
| 2007/0137254 | A1 * | 6/2007 | Fukuzawa ............ G02B 6/4214 65/386 |
| 2008/0037929 | A1 * | 2/2008 | Kim .................... H05K 1/0274 385/14 |
| 2008/0118200 | A1 * | 5/2008 | Kim .................... H05K 1/0274 385/14 |
| 2008/0279518 | A1 * | 11/2008 | Yonekura ................ G02B 6/43 385/127 |
| 2009/0065132 | A1 * | 3/2009 | Yamamoto ............. B32B 37/02 156/248 |
| 2009/0080846 | A1 * | 3/2009 | Shao ................... G02B 6/1221 427/163.2 |
| 2009/0261488 | A1 * | 10/2009 | Shimizu ................. G02B 6/43 264/1.29 |
| 2010/0142896 | A1 * | 6/2010 | Riester .................. G02B 6/138 29/829 |
| 2010/0142904 | A1 * | 6/2010 | Yanagisawa ............ G02B 6/43 385/131 |
| 2011/0299808 | A1 * | 12/2011 | Matsuoka ............ G02B 6/4214 385/14 |
| 2013/0259430 | A1 * | 10/2013 | Tanaka ................ H05K 1/0274 385/88 |
| 2013/0330035 | A1 * | 12/2013 | Shin ..................... G02B 6/12 385/14 |
| 2014/0177995 | A1 * | 6/2014 | Mohammed ........ G02B 6/12004 385/79 |
| 2016/0109699 | A1 * | 4/2016 | Margallo ........... G01B 9/02051 359/205.1 |
| 2016/0356961 | A1 * | 12/2016 | Hu ...................... G02B 6/3608 |
| 2018/0337111 | A1 * | 11/2018 | Jou ..................... G02B 6/4214 |
| 2022/0005787 | A1 * | 1/2022 | Han .................. H01L 23/49833 |

OTHER PUBLICATIONS

Kubota, Machine Translation of JP 2013-174837 A, Sep. 2013. (Year: 2013).*

* cited by examiner

OPTICAL INTERCONNECT STRUCTURE, PACKAGE STRUCTURE AND FABRICATING METHOD THEREOF

BACKGROUND

The semiconductor industry has experienced rapid growth due to ongoing improvements in the integration density of a variety of electronic components (e.g., transistors, diodes, resistors, capacitors, etc.). For the most part, improvement in integration density has resulted from iterative reduction of minimum feature size, which allows more components to be integrated into a given area. As the demand for shrinking electronic devices has grown, a need for smaller and more creative packaging techniques of semiconductor dies has emerged.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
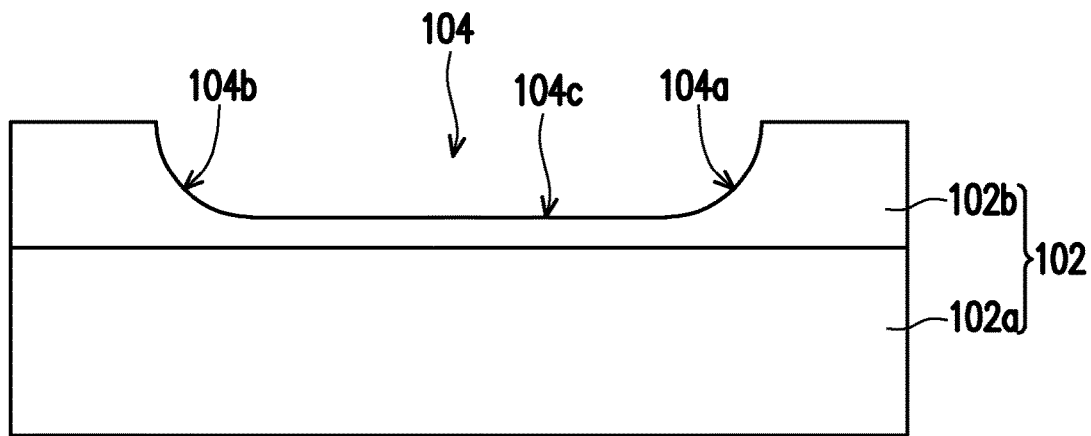
FIGS. 1A through 1I are cross-sectional views of intermediate steps of a process for forming an optical interconnect structure in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

Electrical input/output (I/O) interconnect (e.g., copper wirings) will be the bottleneck in data transmission rate as the minimum feature size in the integrated circuit dies decreases (e.g., CMOS node <7 nm). To enhance the performance (e.g., data transmission rate, I/O bandwidth, data transmission length, and so on) of package structures, an optical I/O interconnect may be implemented. Furthermore, by implementation of optical I/O interconnect, size of the package structures may be miniaturized and transmission cost may be reduced.

FIGS. 1A through 1I are cross-sectional views of intermediate steps of a process for forming an optical interconnect structure in accordance with some embodiments.

Referring to FIG. 1A, a base substrate 102 including a semiconductor substrate 102a and a base dielectric layer 102b disposed on a top surface of the semiconductor substrate 102a is provided. The semiconductor substrate 102a may be or include a bare semiconductor wafer. In some embodiments, the semiconductor substrate 102a includes a crystalline silicon wafer. In some other embodiments, the semiconductor substrate 102a includes other suitable elemental semiconductor, such as diamond or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide. In some embodiments, the base dielectric layer 102b is formed of a polymer, which may also be a photosensitive material such as polybenzoxazole (PBO), polyimide (PI), benzocyclobutene (BCB), or the like, which may be easily patterned using a lithography process. In some other embodiments, the dielectric layer 102b is formed of an inorganic dielectric material, which may also be a non-photosensitive material such as silicon nitride, silicon oxide, PhosphoSilicate Glass (PSG), BoroSilicate Glass (BSG), Boron-doped PhosphoSilicate Glass (BPSG), or the like.

A recess 104 is formed in the base dielectric layer 102b, and the recess 104 may include a curved sidewall 104a, a curved sidewall 104b, and a bottom surface 104c. The curved sidewalls 104a and 104b connect between the bottom surface 104c and the top surface of the base dielectric layer 102b. As illustrated in FIG. 1A, the curved sidewalls 104a and 104b may be rounded and concave-up sidewalls. Other types of sidewalls may be formed in the base dielectric layer 102b. For example, not illustrated in figures, flat and tapered sidewalls are formed in the base dielectric layer 102b.

In an embodiment where the base dielectric layer 102b is formed of a photosensitive material, the photosensitive base dielectric layer 102b is patterned through a lithography process, and the lithography process may include exposure of the photosensitive base dielectric layer 102b, development of the exposed base dielectric layer 102b, and curing of the exposed and developed base dielectric layer 102b. To form the recess 104 including the curved sidewalls 104a and 104b, a grey tone mask may be utilized in the lithography process when performing the exposure of the photosensitive base dielectric layer 102b.

In another embodiment where the base dielectric layer 102b is formed of a non-photosensitive material, a patterned photoresist layer is formed on the top surface of the base dielectric layer 102b, and an etch process is performed to form the recess 104 in the non-photosensitive base dielectric layer 102b. The patterned photoresist layer may be formed on the base dielectric layer 102b through a lithography process, and the lithography process may include spin coating of photoresist material, baking of the photoresist material, exposure of the baked photoresist material, and development of the exposed photoresist material. To form the recess 104 including the curved sidewalls 104a and 104b, a grey tone mask may be utilized in the lithography process when performing the exposure of the baked photoresist material.

Figure 1B:
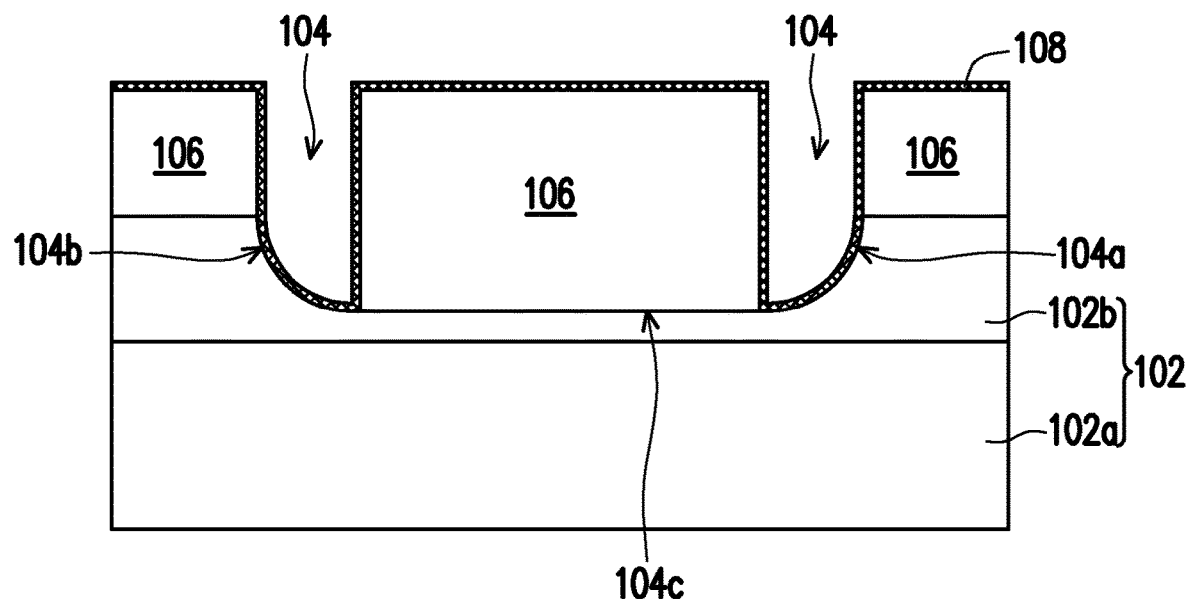

Referring to FIG. 1A and FIG. 1B, a patterned photoresist layer 106 including openings defined therein is formed on the base dielectric layer 102b to cover the bottom surface 104c of the recess 104 and the top surface of the base dielectric layer 102b. The curved sidewalls 104a and 104b of the recess 104 are revealed by the openings defined in the patterned photoresist layer 106. The patterned photoresist layer 106 may be formed on the bottom surface 104c of the recess 104 and the top surface of the base dielectric layer 102b through a lithography process, and the lithography process may include spin coating of photoresist material, baking of the photoresist material, exposure of the baked photoresist material, and development of the exposed photoresist material.

As illustrated in FIG. 1B, after forming the patterned photoresist layer 106 on the base dielectric layer 102b, a reflective material layer 108 is conformally formed to cover the curved sidewall 104a, the curved sidewall 104b, and the patterned photoresist layer 106. The reflective material layer 108 may conformally cover the top surface of the patterned photoresist layer 106, sidewalls of the patterned photoresist layer 106, the curved sidewall 104a, and the curved sidewall 104b. In some embodiments, the reflective material layer 108 includes a metallic layer such as a Ti/Cu layer, and the Ti/Cu layer may be formed on the base dielectric layer 102b through a sputtering process. The material, configuration, and fabricating process of the reflective material layer 108 may modified in accordance with design requirements.

Figure 1C:
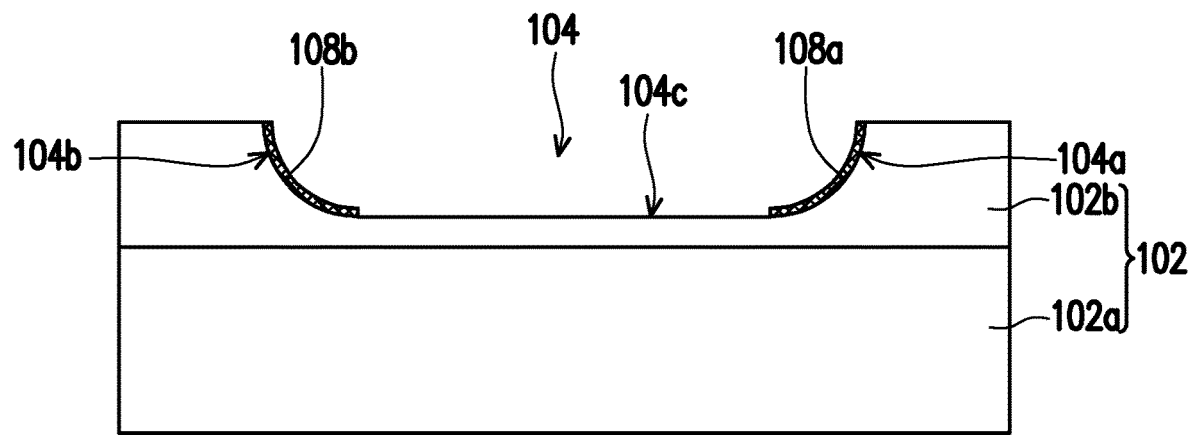

Referring to FIG. 1B and FIG. 1C, a removal process of the patterned photoresist layer 106 is performed such that the patterned photoresist layer 106 and portions of the reflective material layer 108 in contact with the patterned photoresist layer 106 are removed simultaneously. When performing the removal process of the patterned photoresist layer 106, portions the reflective material layer 108 which cover the top surface and the sidewalls of the patterned photoresist layer 106 are lifted off, and the rest portions of the reflective material layer 108 (i.e., a first reflector 108a and a second reflector 108b) which cover the curved sidewall 104a and the curved sidewall 104b remain. In some embodiments, the first reflector 108a includes a first curved reflective surface, and the second reflector 108b includes a second curved reflective surface. As illustrated in FIG. 1C, the first curved reflective surface of the first reflector 108a and the second curved reflective surface of the second reflector 108b may be rounded and concave-up reflective surfaces. In some other embodiments, reflectors with other types of reflective surfaces may be formed. For example, the reflective surfaces of the first reflector 108a and the second reflector 108b may be flat and tapered reflective surfaces.

Figure 1D:
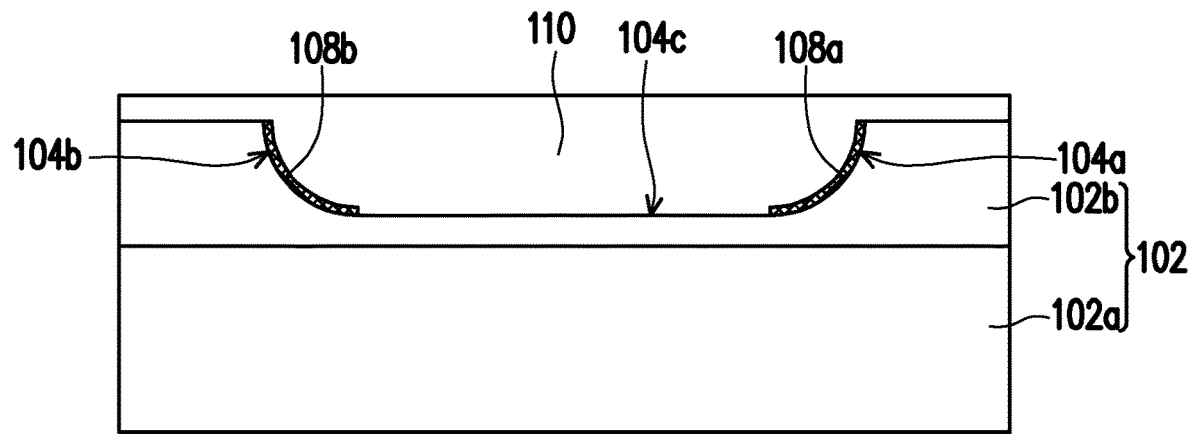

Referring to FIG. 1D, an optical material layer 110 is formed over the base dielectric layer 102b to cover the first reflector 108a and the second reflector 108b. The optical material layer 110 covers the first reflector 108a, the second reflector 108b, the bottom surface 104c of the recess 104, and the top surface of the base dielectric layer 102b. The optical material layer 110 is thick enough to fill the recess 104 formed in the base dielectric layer 102b. A level height of the top surface of the optical material layer 110 is higher than a level height of the top surface of the base dielectric layer 102b. The top surface of the optical material layer 110 may be substantially flat and paralleled with the top surface of the base dielectric layer 102b. The refractive index of the optical material layer 110 is greater than the refractive index of the base dielectric layer 102b such that total internal reflection may occur at the interface between the optical material layer 110 and the base dielectric layer 102b. In some embodiments, the material of the optical material layer 110 includes polyimide, polyolefin, polybenzoxazole (PBO), benzocyclobutene (BCB), polynorbornene, acrylate, epoxy, siloxane, a combination thereof, or the like. In some other embodiments, the material of the optical material layer 110 includes silicon oxide or silicon nitride.

Figure 1E:
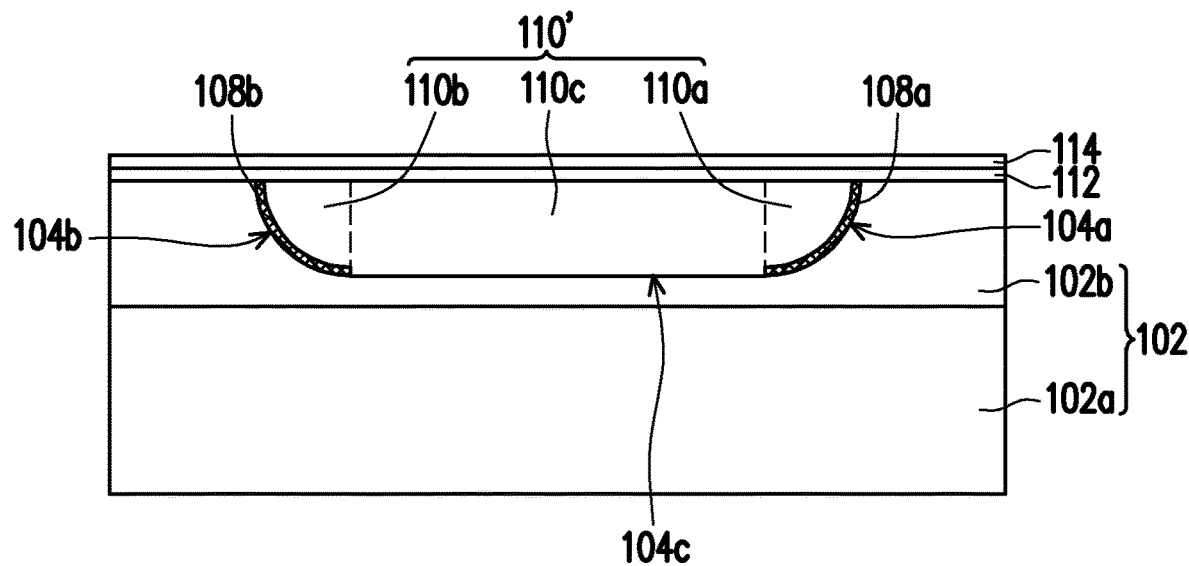

Referring to FIG. 1D and FIG. 1E, a removal process of the optical material layer 110 is performed until the top surface of the base dielectric layer 102b, a top end of the first reflector 108a and a top end of the second reflector 108b are revealed. An upper portion of the optical material layer 110 is removed until the top surface of the base dielectric layer 102b and a top end of the first reflector 108a and a top end of the second reflector 108b are revealed. After performing the removal process of the optical material layer 110, an optical wave guide 110' embedded in the base dielectric layer 102b is formed. The top surface of the optical wave guide 110' may substantially level with the top surface of the base dielectric layer 102b. The maximum thickness of the optical waveguide 110' is less than a thickness of the base dielectric layer 102b. In some embodiments, the removal process of the optical material layer 110 includes a chemical mechanical polishing (CMP) process, a mechanical grinding process, or combinations thereof. The optical wave guide 110' may include a first end portion 110a, a second end portion 110b, and a guiding portion 110c. The first end portion 110a of the optical wave guide 110' is disposed on and in contact with the first reflector 108a. The second end portion 110b of the optical wave guide 110' is disposed on and in contact with the second reflector 108b. The guiding portion 110c is disposed between the first end portion 110a and the second end portion 110b. The guiding portion 110c of the optical wave guide 110' is disposed on and in contact with the bottom surface 104c of the recess 104 formed in the base dielectric layer 102b. In some embodiments, the first end portion 110a, the second end portion 110b and the guiding portion 110c of the optical wave guide 110' are identical in material. In other words, the optical wave guide 110' is a homogeneous optical wave guide. There is no obvious interface between the guiding portion 110c and the first end portion 100a. There is no obvious interface between the guiding portion 110c and the second end portion 110b as well.

After forming the optical wave guide 110', dielectric layers 112 and 114 are formed over the top surface of the optical wave guide 110' and the top surface of the base dielectric layer 102b. The material of the dielectric layer 112 may be identical with or different from the material of the base dielectric layer 102b. The refractive index of the optical material layer 110 is greater than the refractive index of the dielectric layer 112 such that total internal reflection may occur at the interface between the guiding portion 110c of the optical wave guide 110' and the dielectric layer 112. In some embodiments, the material of the dielectric layer 112 includes polyimide, polyolefin, polybenzoxazole (PBO), benzocyclobutene (BCB), polynorbornene, acrylate, epoxy, siloxane, a combination thereof, or the like. In some other embodiments, the material of the dielectric layer 112 includes silicon oxide or silicon nitride. The material of the dielectric layer 114 may be identical with or different from the material of the dielectric layer 112. In some embodiments, the material of the dielectric layer 114 includes polyimide, polyolefin, polybenzoxazole (PBO), benzocyclobutene (BCB), polynorbornene, acrylate, epoxy, siloxane, a combination thereof, or the like. In some other embodiments, the material of the dielectric layer 114 includes silicon oxide or silicon nitride. The number and material of the dielectric layers 112 and 114 may be modified in accordance with design requirements.

As illustrated in FIG. 1E, the top ends of the first reflector 108a and the second reflector 108b are physically in contact with the bottom surface of the dielectric layer 112. The optical wave guide 110' is wrapped around by the dielectric layer 112 and the base dielectric layer 102b such that a lateral optical transmission path is established in the base dielectric layer 102b.

Figure 1F:
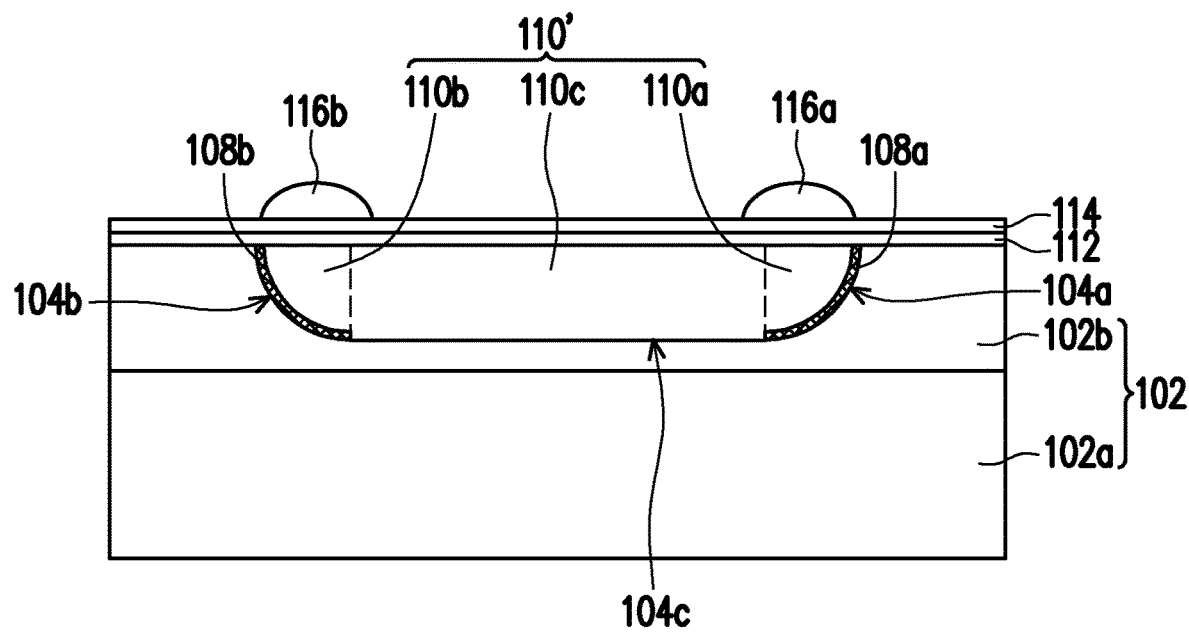

Referring to FIG. 1F, a first lens 116a and a second lens 116b are formed over the dielectric layers 112 and 114. The first lens 116a is disposed on the dielectric layer 114 and located above the first reflector 108a, and the second lens 116b is disposed on the dielectric layer 114 and located above the second reflector 108b. The first lens 116a is located above the first end portion 110a of the optical wave guide 110', and the second lens 116b is located above the second end portion 110b of the optical wave guide 110'. Furthermore, portions of the guiding portion 110c which are in proximity to the first end portion 110a and the second end portion 110b may be covered by the first lens 116a and the second lens 116b. As illustrate in FIG. 1F, the first lens 116a and the second lens 116b formed on the dielectric layer 114 may be flat convex lens. The flat optical surfaces of the first lens 116a and the second lens 116b is in contact with the dielectric layer 114.

Figure 1G:
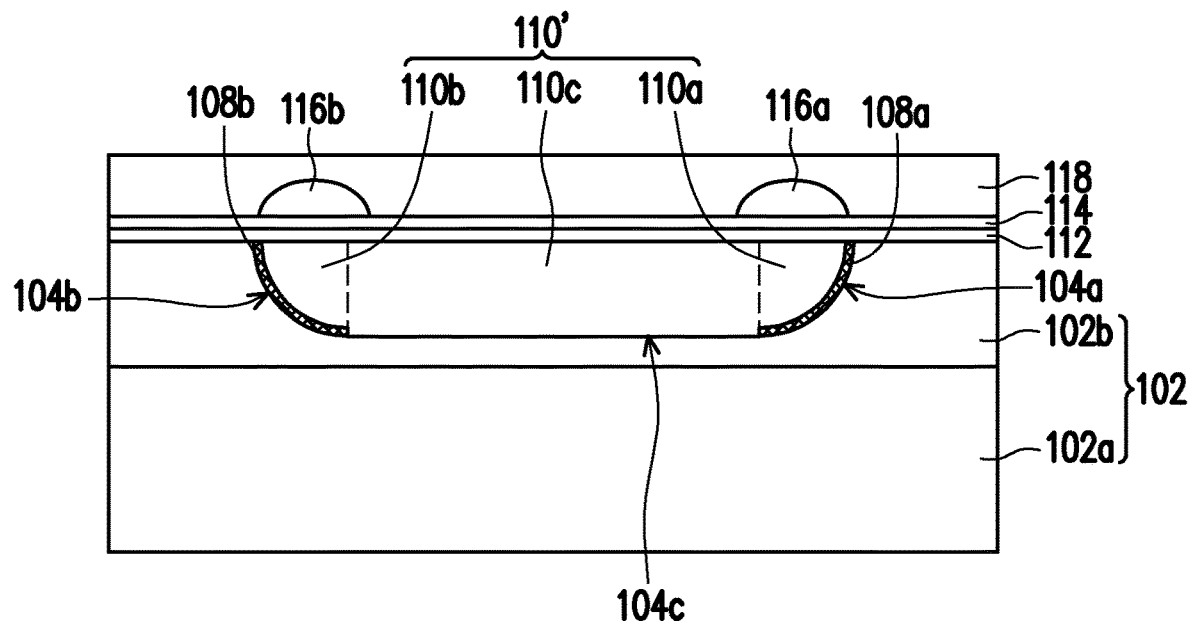

Referring to FIG. 1G, a protection layer 118 is formed to cover the dielectric layer 114, the first lens 116a and the second lens 116b. The top surface of the protection layer 118 may be substantially flat and paralleled with the top surface of the dielectric layers 112 and 114. The convex optical surfaces of the first lens 116a and the second lens 116b is covered and in contact with the protection layer 118. In some other embodiments, the material of the protection layer 118 includes silicon oxide or silicon nitride. The material of the protection layer 118 may be identical with or different from the material of the dielectric layer 112 or 114. In some embodiments, the material of the protection layer 118 includes polyimide, polyolefin, polybenzoxazole (PBO), benzocyclobutene (BCB), polynorbornene, acrylate, epoxy, siloxane, a combination thereof, or the like. The material of the protection layer 118 may be modified in accordance with design requirements.

Figure 1H:
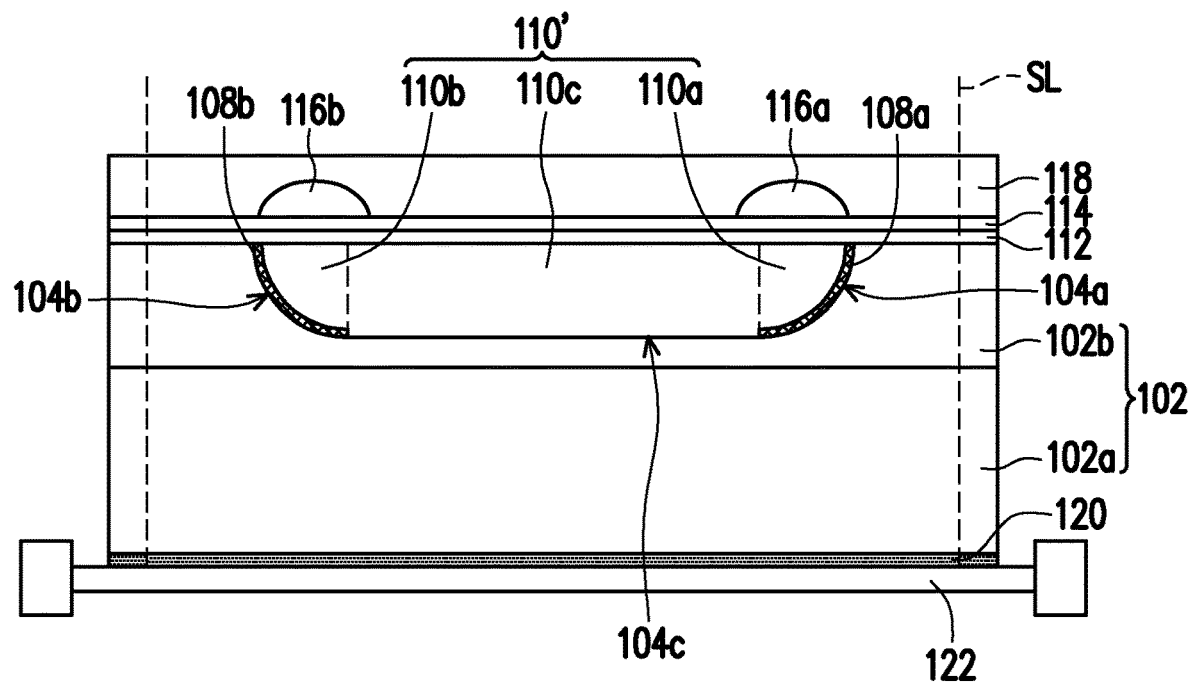

Referring to FIG. 1H, an adhesive layer 120 is attached to a bottom surface of the semiconductor substrate 102a. The adhesive layer 120 and the base dielectric layer 102b are respectively disposed on opposite surfaces (i.e., the top surface and the bottom surface) of the semiconductor substrate 102a. The adhesive layer 120 may be or include epoxy resin, polyepoxide, PET, PVC based resin, or the like. Then, a frame mount process is performed such that the resulted structure illustrated in FIG. 1G is attached onto a saw tape 122 carried by a frame through the adhesive layer 120.

Figure 1I:
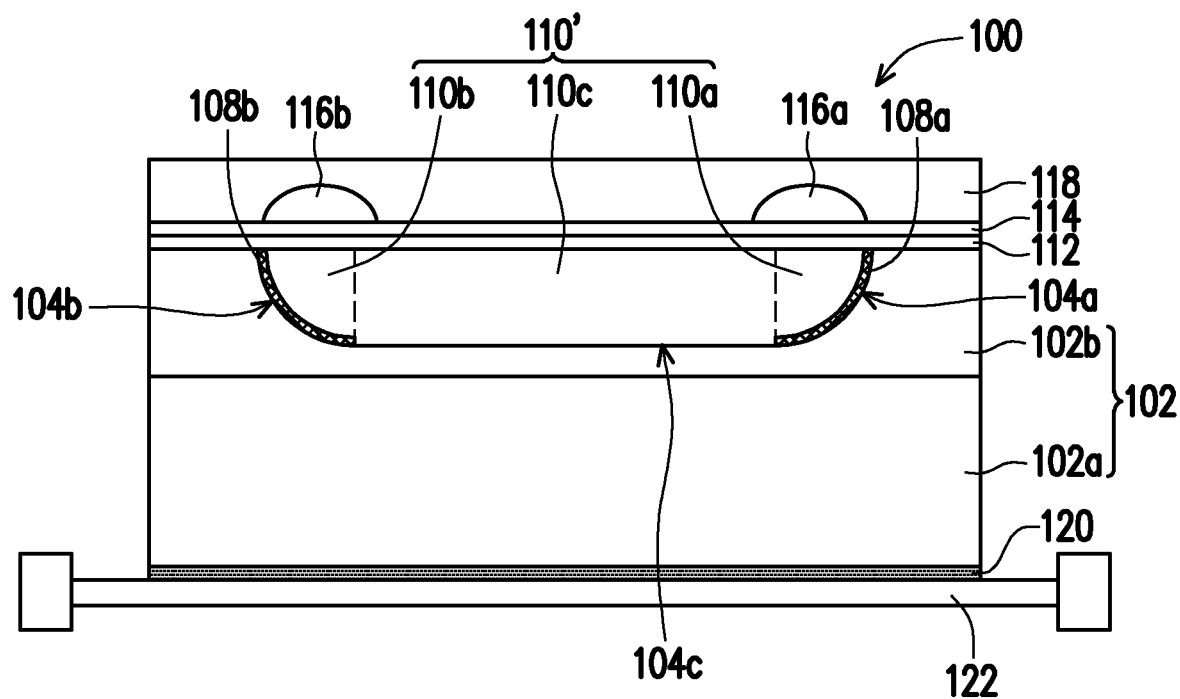

Referring to FIG. 1H and FIG. 1I, a singulation process is performed along scribe lines SL such that singulated optical interconnect structures 100 are obtained. The singulated optical interconnect structure 100 includes a base substrate 102, an optical waveguide 110', a first reflector 108a, a second reflector 108b, dielectric layers 112 and 114, a first lens 116a, and a second lens 116b is provided. The optical waveguide 110' is embedded in the base substrate 102. The optical waveguide 110' includes a first end portion 110a and a second end portion 110b opposite to the first end portion 110a. The first reflector 108a is disposed between the base substrate 102 and the first end portion 110a of the optical waveguide 110'. The second reflector 108b is disposed between the base substrate 102 and the second end portion 110b of the optical waveguide 110'. The dielectric layers 112 and 114 covers the base substrate 102 and the optical waveguide 110'. The first lens 116a is disposed on the dielectric layers 112 and 114. The first lens 116a is located above the first end portion 110a of the optical waveguide 110'. The second lens 116b is disposed on the dielectric layers 112a and 114. The second lens 116b is located above the second end portion 110b of the optical waveguide 110'. In some embodiments, the base substrate 102 includes a semiconductor substrate 102a and a base dielectric layer 102b disposed on a first surface (e.g., the top surface) of the semiconductor substrate 102a. In some embodiments, the optical waveguide 110' is embedded in the base dielectric layer 120b. In some embodiments, the optical waveguide 110' is spaced apart from the semiconductor substrate 102a by the base dielectric layer 102b. In some embodiments, the optical waveguide 110' further includes a guiding portion 110c embedded in the base dielectric layer 102b of the base substrate 102, and the guiding portion 110c is between the first end portion 110a and the second end portion 110b. In some embodiments, a material of the guiding portion 110c is identical to a material of the first end portion 110a and the second end portion 110b. In some embodiments, the optical interconnect structure 100 further includes a protection layer 118 covering the dielectric layer 114, the first lens 116a, and the second lens 116b. In some embodiments, the optical interconnect structure 100 further includes an adhesive layer 120 disposed on a second surface (e.g., the bottom surface) of the semiconductor substrate 102a, and the second surface is opposite to the first surface.

FIGS. 2A through 2L are cross-sectional views of intermediate steps of a process for forming an optical interconnect structure in accordance with some other embodiments.

Referring to FIGS. 1A through 1D and FIGS. 2A through 2D, the process flow illustrated in FIGS. 2A through 2D is identical to the process flow illustrated in FIGS. 1A through 1D. The detailed descriptions of the process flow illustrated in FIGS. 2A through 2D are omitted.

Figure 2A:
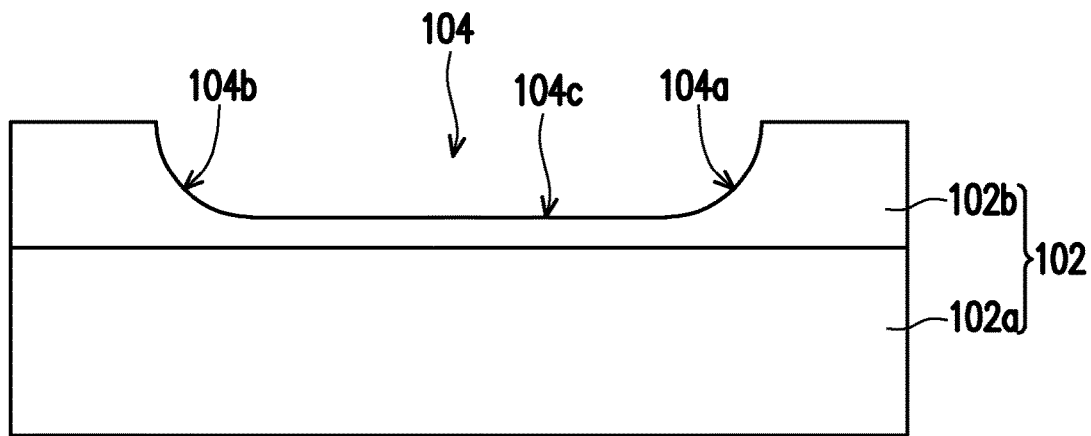
FIGS. 2A through 2L are cross-sectional views of intermediate steps of a process for forming an optical interconnect structure in accordance with some other embodiments.
Figure 2B:
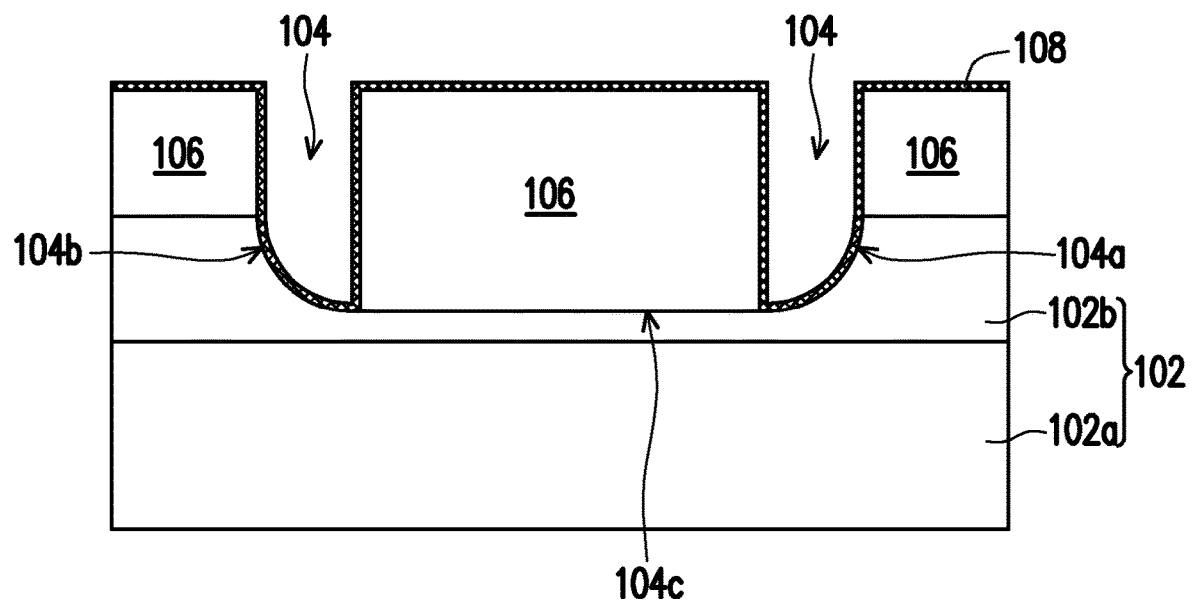
Figure 2C:
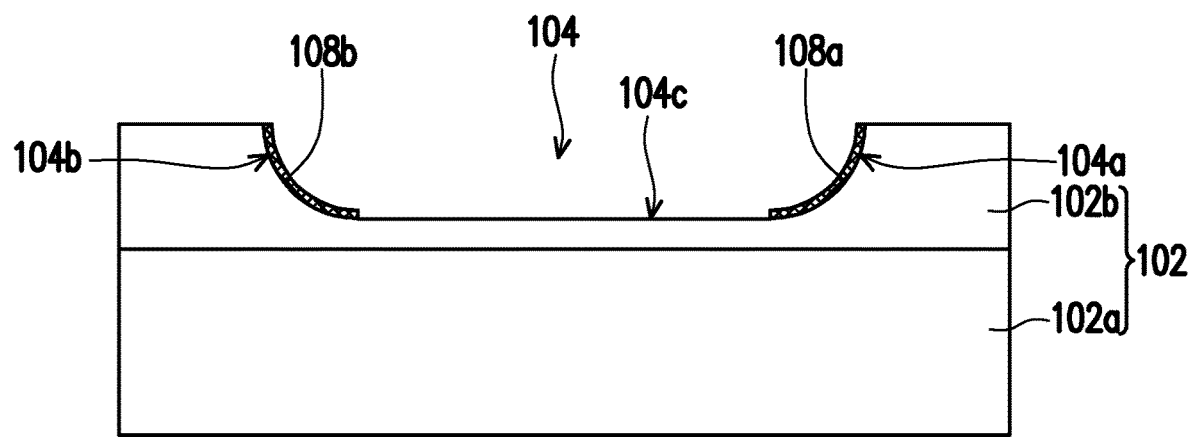
Figure 2D:
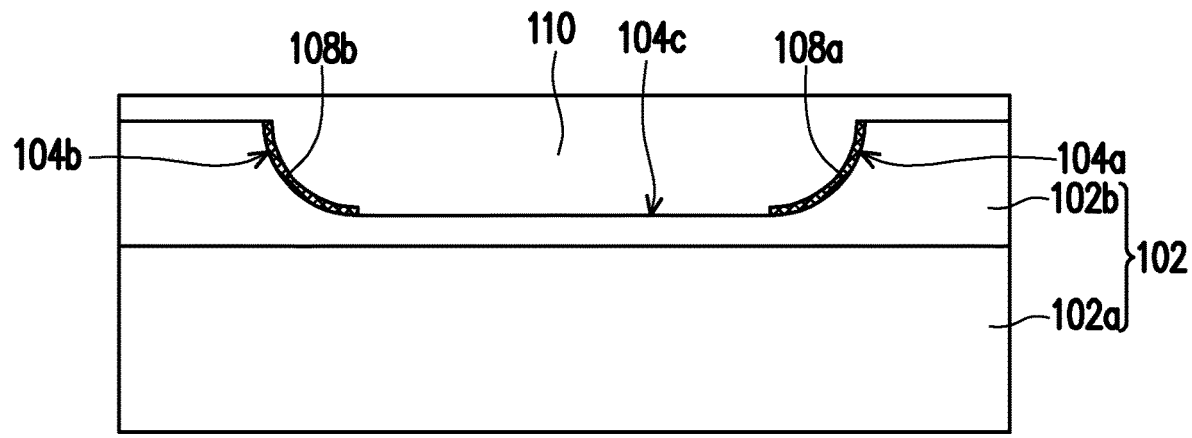
Figure 2E:
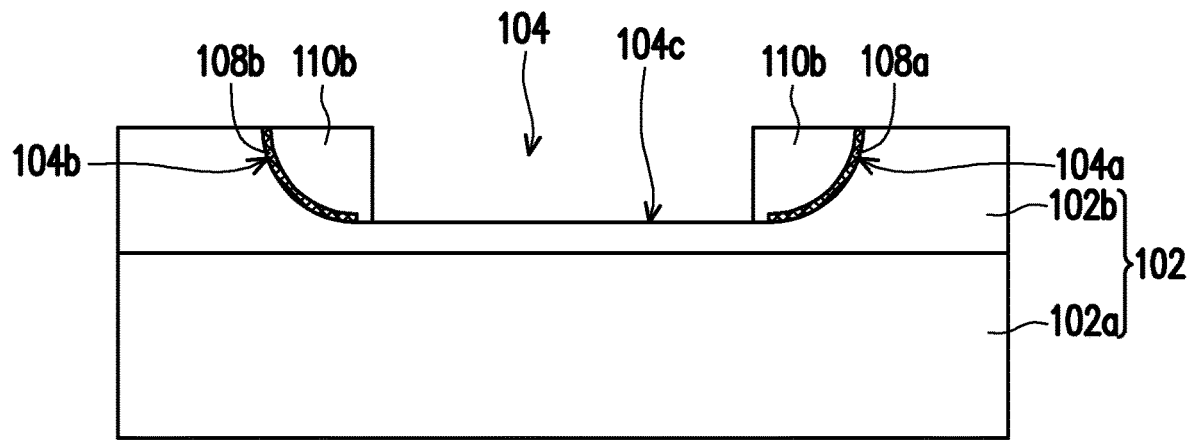

Referring to FIG. 2D and FIG. 2E, a patterning process of the optical material layer 110 is performed to remove portions of the optical material layer 110 such that the top surface of the base dielectric layer 102b, top ends of the first reflector 108a and the second reflector 108b, and the bottom surface 104c of the recess 104 are revealed. The material of the optical material layer 110 may be or include a photosensitive material or a non-photosensitive material. In an embodiment where the optical material layer 110 is formed of a photosensitive material, the photosensitive optical material layer 110 is patterned through a lithography process to form a first end portion 110a and a second end portion 110b. The lithography process may include exposure of the photosensitive optical material layer 110, development of the exposed optical material layer 110, and curing of the exposed and developed optical material layer 110. In another embodiment where the optical material layer 110 is formed of a non-photosensitive material, a patterned photoresist layer is formed on the top surface of the optical material layer 110, and an etch process is performed to form a first end portion 110a and a second end portion 110b in recess 104 of the base dielectric layer 102b. The patterned photoresist layer may be formed on the optical material layer 110 through a lithography process, and the lithography process may include spin coating of photoresist material, baking of the photoresist material, exposure of the baked photoresist material, and development of the exposed photoresist material. The first end portion 110a and the second end portion 110b cover the first reflector 108a and the second reflector 108b respectively. The top surfaces of the first end portion 110a and the second end portion 110b may substantially level with the top surface of the base dielectric layer 102b.

Figure 2F:
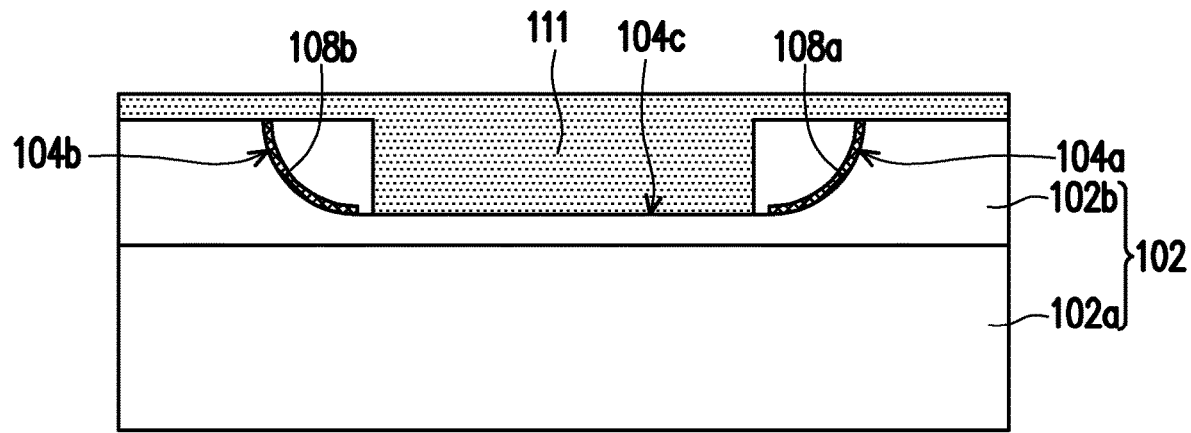

Referring to FIG. 2F, after performing the patterning process of the optical material layer 110, an optical material layer 111 is formed over the base dielectric layer 102b to cover the first end portion 110a and the second end portion 110b. The optical material layer 111 covers the first end portion 110a, the second end portion 110b, the bottom surface 104c of the recess 104, and the top surface of the base dielectric layer 102b. The optical material layer 111 is thick enough to fill a portion of the recess 104 which is not occupied by the first end portion 110a and the second end portion 110b. A level height of the top surface of the optical material layer 111 is higher than a level height of the top surface of the base dielectric layer 102b. The top surface of the optical material layer 111 may be substantially flat and paralleled with the top surface of the base dielectric layer 102b. The refractive index of the optical material layer 111 is greater than the refractive index of the base dielectric layer 102b such that total internal reflection may occur at the interface (e.g., the bottom surface 104c) between the optical material layer 111 and the base dielectric layer 102b. In some embodiments, the material of the optical material layer 111 includes polyimide, polyolefin, polybenzoxazole (PBO), benzocyclobutene (BCB), polynorbornene, acrylate, epoxy, siloxane, a combination thereof, or the like. In some other embodiments, the material of the optical material layer 111 includes silicon oxide or silicon nitride. Furthermore, the material of the optical material layer 111 may be different from the material of the first end portion 110a and the second end portion 110b. In other words, the refractive index of the optical material layer 111 may be different from the refractive index of the first end portion 110a and the second end portion 110b.

Figure 2G:
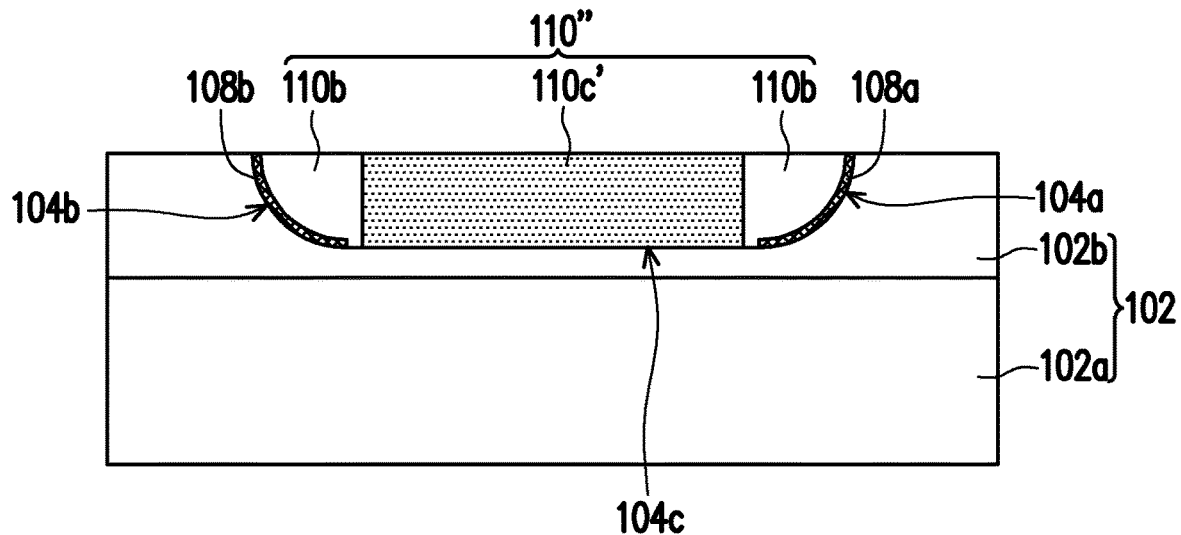

Referring to FIG. 2F and FIG. 2G, a removal process of the optical material layer 111 is performed until the top surface of the base dielectric layer 102b, the top surface of the first end portion 110a, the top surface of the second end portion 110b, the top end of the first reflector 108a and the top end of the second reflector 108b are revealed. An upper portion of the optical material layer 111 is removed until the top surface of the base dielectric layer 102b, the top surface of the first end portion 110a, the top surface of the second end portion 110b, the top end of the first reflector 108a and the top end of the second reflector 108b are revealed. After performing the removal process of the optical material layer 111, an optical wave guide 110" embedded in the base dielectric layer 102b is formed. The top surface of the optical wave guide 110" may substantially level with the top surface of the base dielectric layer 102b. In some embodiments, the removal process of the optical material layer 111 includes a chemical mechanical polishing (CMP) process, a mechanical grinding process, or combinations thereof. The optical wave guide 110" may include a first end portion 110a, a second end portion 110b, and a guiding portion 110c'. The first end portion 110a of the optical wave guide 110" is disposed on and in contact with the first reflector 108a. The second end portion 110b of the optical wave guide 110" is disposed on and in contact with the second reflector 108b. The guiding portion 110c' is disposed between the first end portion 110a and the second end portion 110b. The guiding portion 110c' of the optical wave guide 110" is disposed on and in contact with the bottom surface 104c of the recess 104 formed in the base dielectric layer 102b. The material of the guiding portion 110c' may be different from the material of the first end portion 110a and the second end portion 110b. In other words, the refractive index of the guiding portion 110c' may be different from the refractive index of the first end portion 110a and the second end portion 110b. Accordingly, a first interface is formed between the guiding portion 110c' and the first end portion 100a, and a second interface is formed between the guiding portion 110c' and the second end portion 110b.

As illustrated in FIG. 2G, the first reflector 108a are spaced apart from the guiding portion 110c' of the optical wave guide 110" by the first end portion 110a. The first reflector 108b are spaced apart from the guiding portion 110c' of the optical wave guide 110" by the first end portion 110a. In some other embodiments, not illustrated in figure, a bottom end of the first reflector 108a and a bottom end of the second reflector 108b are in contact with the guiding portion 110c' of the optical wave guide 110".

Figure 2H:
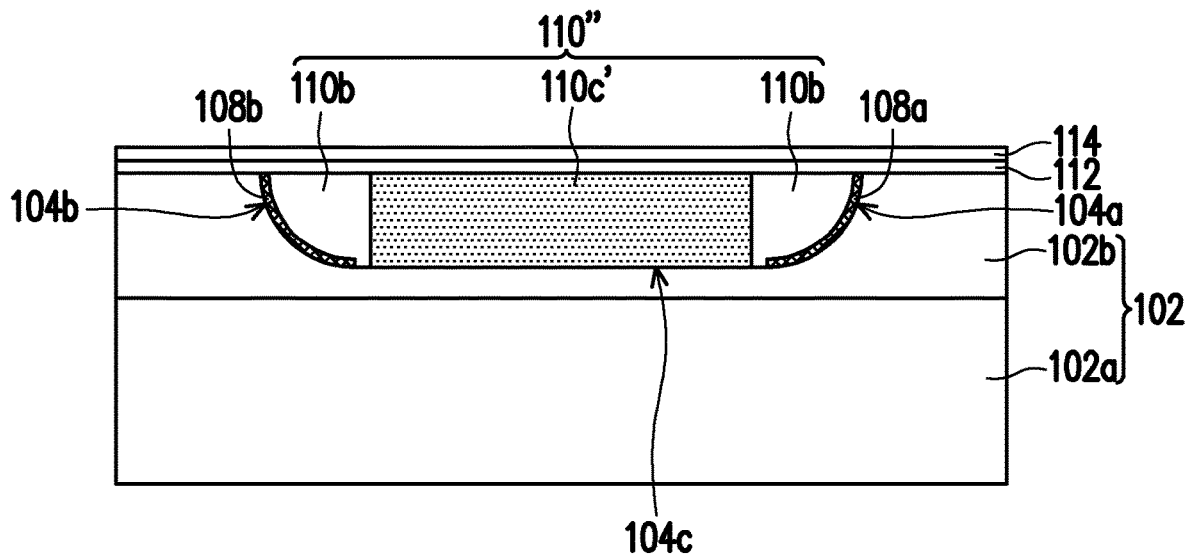

Referring to FIG. 2G and FIG. 2H, after forming the optical wave guide 110", dielectric layers 112 and 114 are formed over the top surface of the optical wave guide 110" and the top surface of the base dielectric layer 102b. The material of the dielectric layer 112 may be identical with or different from the material of the base dielectric layer 102b. The refractive index of the optical wave guide 110" is greater than the refractive index of the dielectric layer 112 such that total internal reflection may occur at the interface between the guiding portion 110c' of the optical wave guide 110" and the dielectric layer 112. In some embodiments, the material of the dielectric layer 112 includes polyimide, polyolefin, polybenzoxazole (PBO), benzocyclobutene (BCB), polynorbornene, acrylate, epoxy, siloxane, a combination thereof, or the like. In some other embodiments, the material of the dielectric layer 112 includes silicon oxide or silicon nitride. The material of the dielectric layer 114 may be identical with or different from the material of the dielectric layer 112. In some embodiments, the material of the dielectric layer 114 includes polyimide, polyolefin, polybenzoxazole (PBO), benzocyclobutene (BCB), polynorbornene, acrylate, epoxy, siloxane, a combination thereof, or the like. In some other embodiments, the material of the dielectric layer 114 includes silicon oxide or silicon nitride. The number and material of the dielectric layers 112 and 114 may be modified in accordance with design requirements.

As illustrated in FIG. 2H, the top end of the first reflector 108a and the top end of the second reflector 108b are physically in contact with the bottom surface of the dielectric layer 112. The optical wave guide 110" is wrapped around by the dielectric layer 112 and the base dielectric layer 102b such that a lateral optical transmission path is established in the base dielectric layer 102b.

Figure 2I:
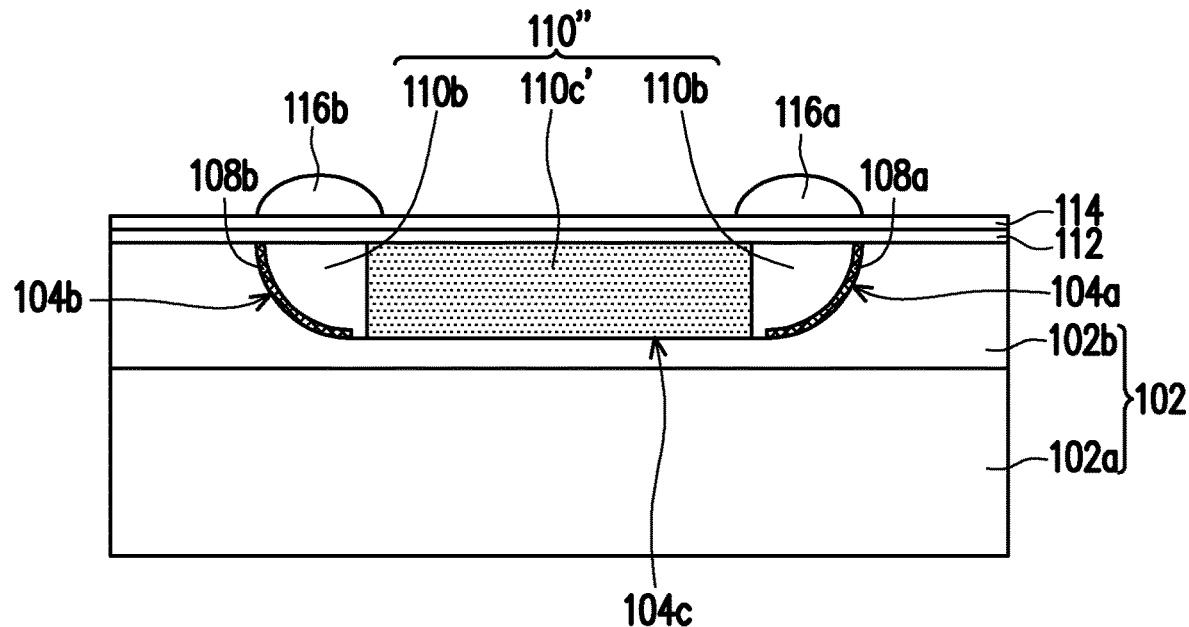

Referring to FIG. 2I, a first lens 116a and a second lens 116b are formed over the dielectric layers 112 and 114. The first lens 116a is disposed on the dielectric layer 114 and located above the first reflector 108a, and the second lens 116b is disposed on the dielectric layer 114 and located above the second reflector 108b. The first lens 116a is located above the first end portion 110a of the optical wave guide 110", and the second lens 116b is located above the second end portion 110b of the optical wave guide 110". Furthermore, portions of the guiding portion 110c' which are in proximity to the first end portion 110a and the second end portion 110b may be covered by the first lens 116a and the second lens 116b. As illustrate in FIG. 2I, the first lens 116a and the second lens 116b formed on the dielectric layer 114 may be flat convex lens. The flat optical surfaces of the first lens 116a and the second lens 116b is in contact with the dielectric layer 114.

Figure 2J:
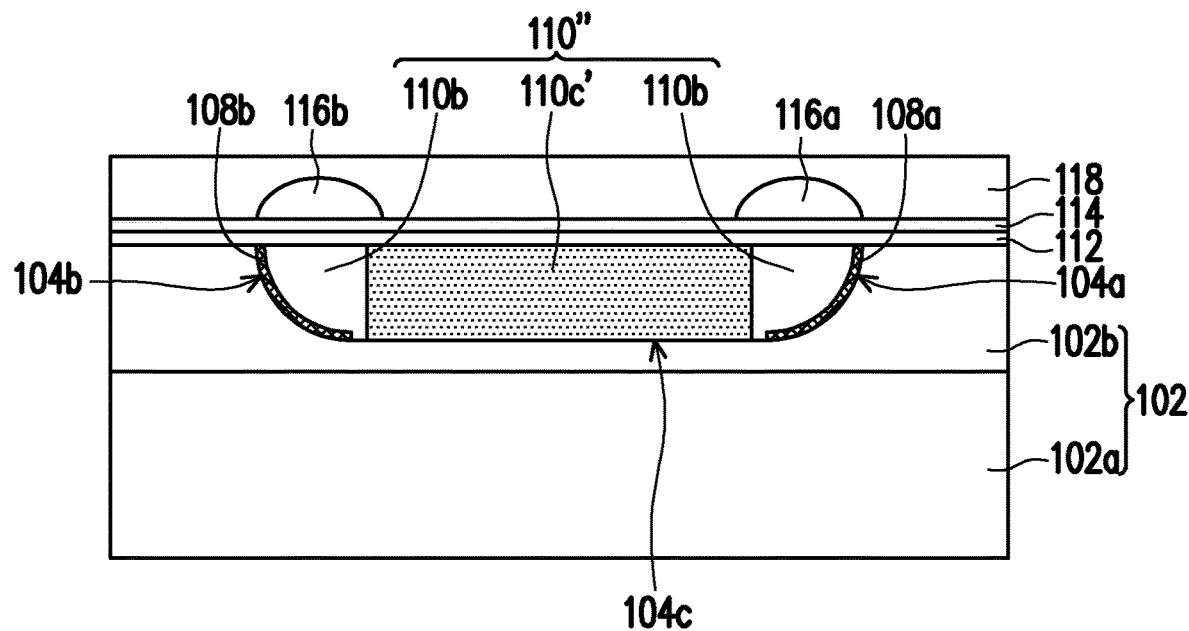

Referring to FIG. 2J, a protection layer 118 is formed to cover the dielectric layer 114, the first lens 116a and the second lens 116b. The top surface of the protection layer 118 may be substantially flat and paralleled with the top surface of the dielectric layers 112 and 114. The convex optical surfaces of the first lens 116a and the second lens 116b is covered and in contact with the protection layer 118. In some other embodiments, the material of the protection layer 118 includes silicon oxide or silicon nitride. The material of the protection layer 118 may be identical with or different from the material of the dielectric layer 112 or 114. In some embodiments, the material of the protection layer 118 includes polyimide, polyolefin, polybenzoxazole (PBO), benzocyclobutene (BCB), polynorbornene, acrylate, epoxy, siloxane, a combination thereof, or the like. The material of the protection layer 118 may be modified in accordance with design requirements.

Figure 2K:
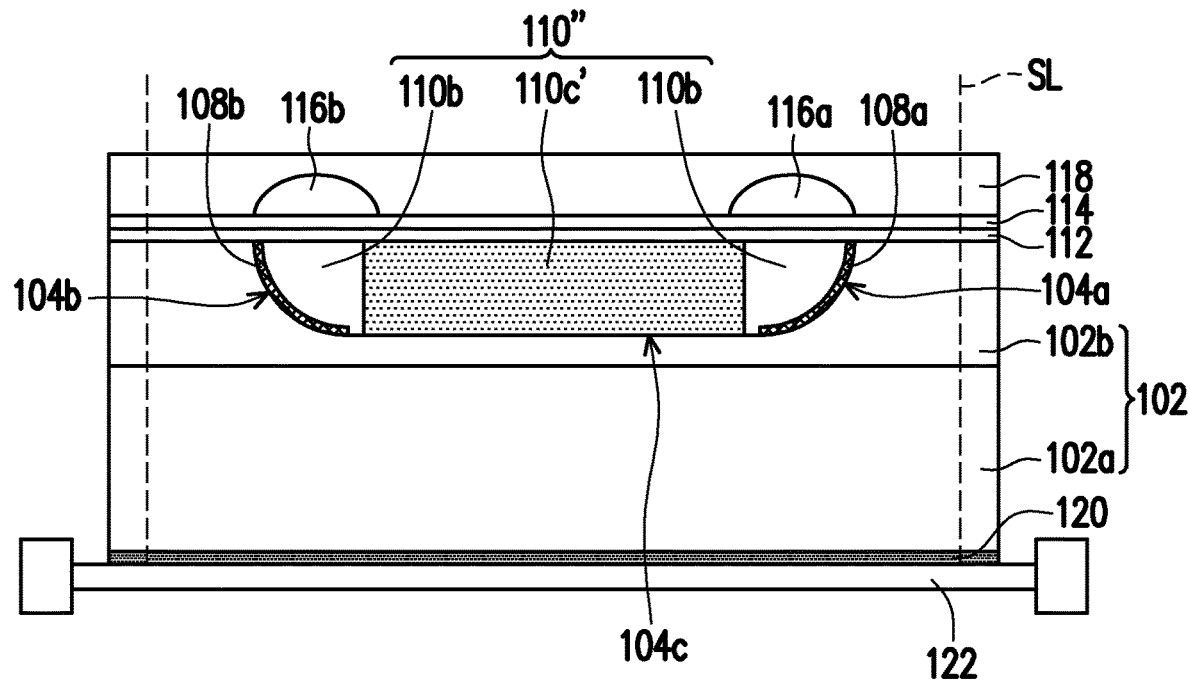

Referring to FIG. 2K, an adhesive layer 120 is attached to a bottom surface of the semiconductor substrate 102a. The adhesive layer 120 and the base dielectric layer 102b are respectively disposed on opposite surfaces (i.e., the top surface and the bottom surface) of the semiconductor substrate 102a. The adhesive layer 120 may be or include epoxy resin, polyepoxide, PET, PVC based resin, or the like. Then, a frame mount process is performed such that the resulted structure illustrated in FIG. 2K is attached onto a saw tape 122 carried by a frame through the adhesive layer 120.

Figure 2L:
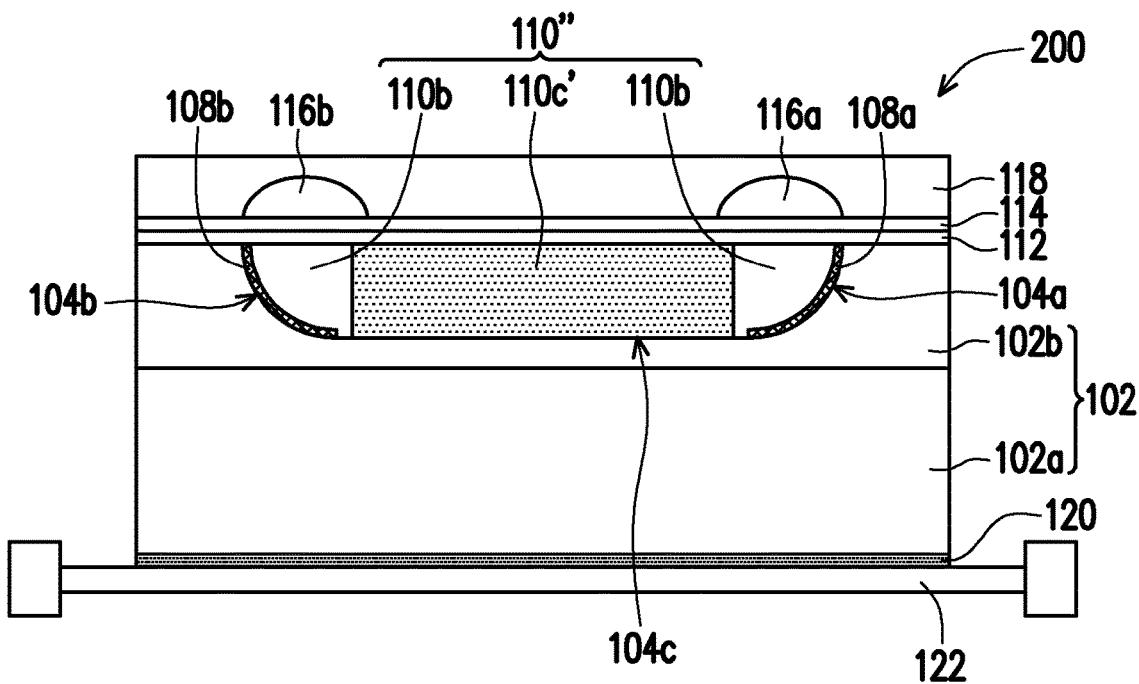

Referring to FIG. 2K and FIG. 2L, a singulation process is performed along scribe lines SL such that singulated optical interconnect structures 200 are obtained. The singulated optical interconnect structure 200 includes a base substrate 102, an optical waveguide 110", a first reflector 108a, a second reflector 108b, dielectric layers 112 and 114, a first lens 116a, and a second lens 116b is provided. The optical waveguide 110" is embedded in the base substrate 102. The optical waveguide 110" includes a first end portion 110a and a second end portion 110b opposite to the first end portion 110a. The first reflector 108a is disposed between the base substrate 102 and the first end portion 110a of the optical waveguide 110". The second reflector 108b is disposed between the base substrate 102 and the second end portion 110b of the optical waveguide 110". The dielectric layers 112 and 114 covers the base substrate 102 and the optical waveguide 110". The first lens 116a is disposed on the dielectric layers 112 and 114. The first lens 116a is located above the first end portion 110a of the optical waveguide 110". The second lens 116b is disposed on the dielectric layers 112a and 114. The second lens 116b is located above the second end portion 110b of the optical waveguide 110". In some embodiments, the base substrate 102 includes a semiconductor substrate 102a and a base dielectric layer 102b disposed on a first surface (e.g., the top surface) of the semiconductor substrate 102a. In some embodiments, the optical waveguide 110" is embedded in the base dielectric layer 120b. In some embodiments, the optical waveguide 110" is spaced apart from the semiconductor substrate 102a by the base dielectric layer 102b. In some embodiments, the optical waveguide 110" further includes a guiding portion 110c' embedded in the base dielectric layer 102b of the base substrate 102, and the guiding portion 110c' is between the first end portion 110a and the second end portion 110b. In some embodiments, a material of the guiding portion 110c' is different from a material of the first end portion 110a and the second end portion 110b. In some embodiments, the optical interconnect structure 200 further includes a protection layer 118 covering the dielectric layer 114, the first lens 116a, and the second lens 116b. In some embodiments, the optical interconnect structure 200 further includes an adhesive layer 120 disposed on a second surface (e.g., the bottom surface) of the semiconductor substrate 102a, and the second surface is opposite to the first surface.

FIGS. 3 through 6 are cross-sectional views of intermediate steps of a process for forming a package structure in accordance with some embodiments.

Figure 3:
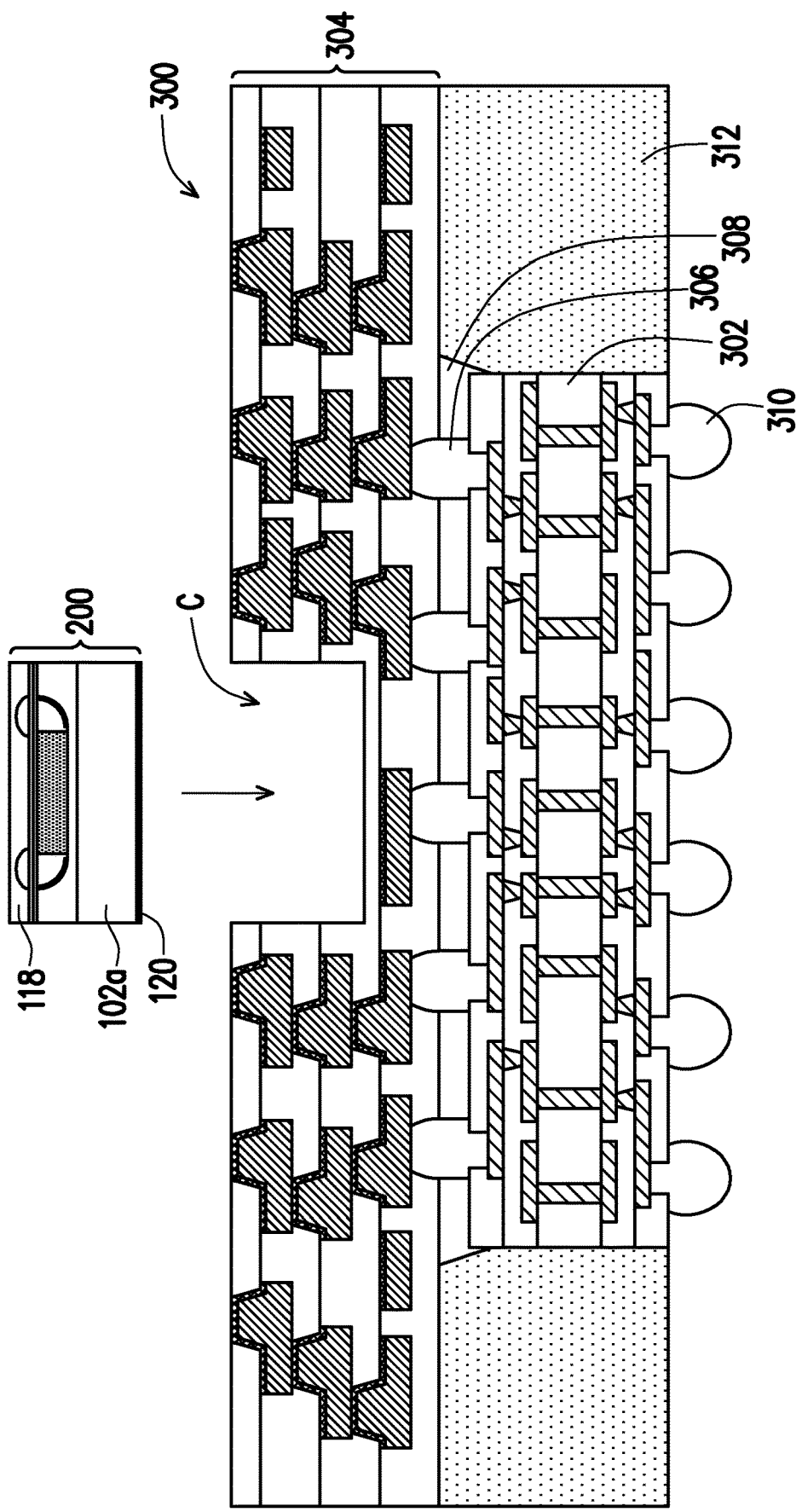
FIGS. 3 through 6 are cross-sectional views of intermediate steps of a process for forming a package structure in accordance with some embodiments.
Figure 4:
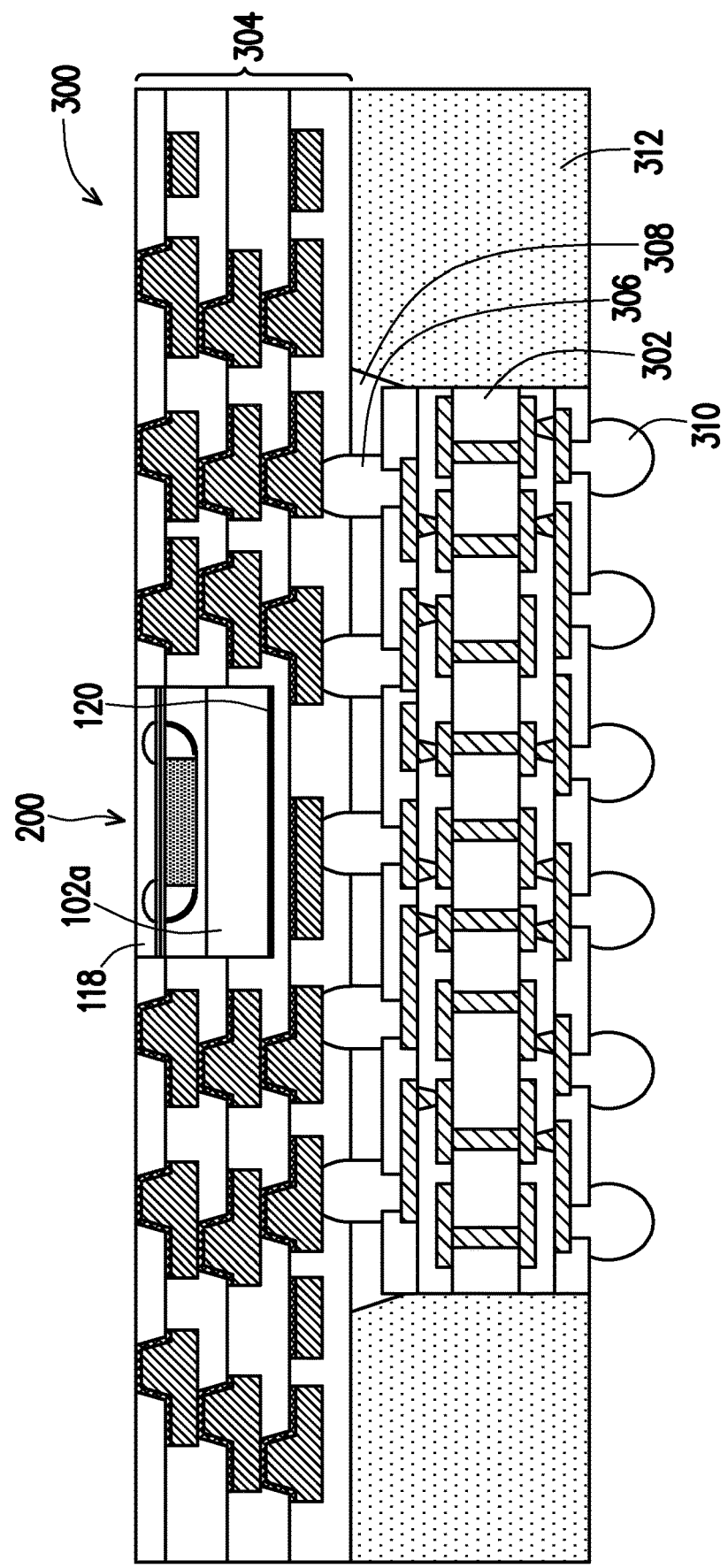

Referring to FIG. 3 and FIG. 4, an integrated substrate 300 including a circuit substrate 302, an insulating encapsulation 312 laterally encapsulating the circuit substrate 302, and a redistribution circuit structure 304 disposed on the circuit substrate 302 and the insulating encapsulation 312 is provided. The integrated substrate 300 may further include conductive terminals 306, an underfill 308, and conductive terminals 310. The conductive terminals 306 and the underfill 308 are disposed between the circuit substrate 302 and the redistribution circuit structure 304. The conductive terminals 306 and the conductive terminals 310 are electrically connected to the circuit substrate 302. The conductive terminals 306 and the conductive terminals 310 are disposed on opposite surfaces of the circuit substrate 302. The circuit substrate 302 is electrically connected to the redistribution circuit structure 304 through the conductive terminals 306 laterally encapsulated by the underfill 308. The insulating encapsulation 312 laterally encapsulates the circuit substrate 302 and the underfill 308. The redistribution circuit structure 304 includes a cavity C for accommodating an optical interconnect structure 200. As illustrated in FIG. 4, the optical interconnect structure 200 may be placed into the cavity C and adhered with the redistribution circuit structure 304 through the adhesive layer 120. After the optical interconnect structure 200 is placed into the cavity C, the protection layer 118 of the optical interconnect structure 200 may substantially level with the top surface of the redistribution circuit structure 304. Furthermore, the semiconductor substrate 102a is adhered to a bottom surface of the cavity C through the adhesive layer 120. The optical interconnect structure 200 embedded in the redistribution circuit structure 304 may serve as an integrated optical device.

In some other embodiments, instead of the optical interconnect structure 200, an optical interconnect structure 100 illustrated in FIG. 1I may be placed into the cavity C and adhered with the redistribution circuit structure 304 through the adhesive layer 120.

Figure 5:
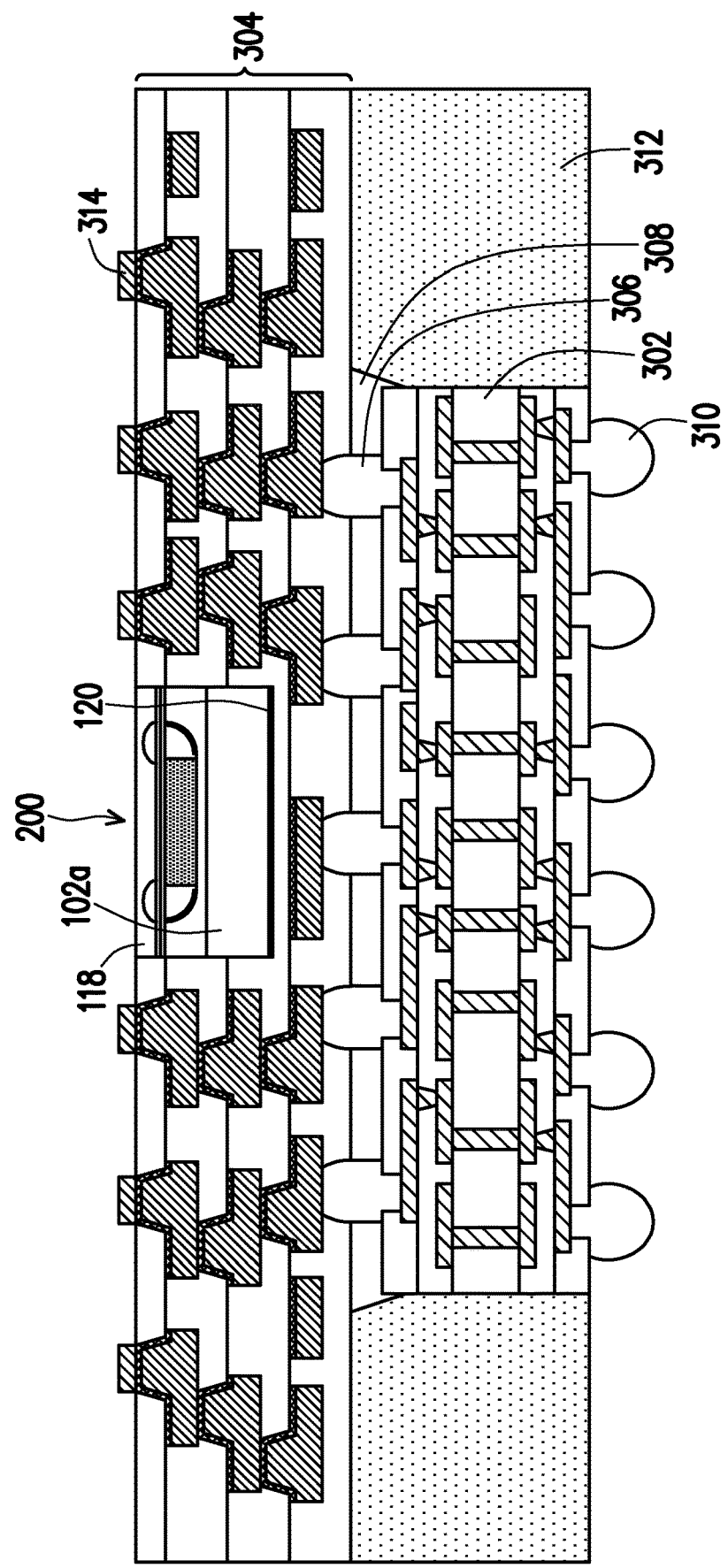
Figure 6:
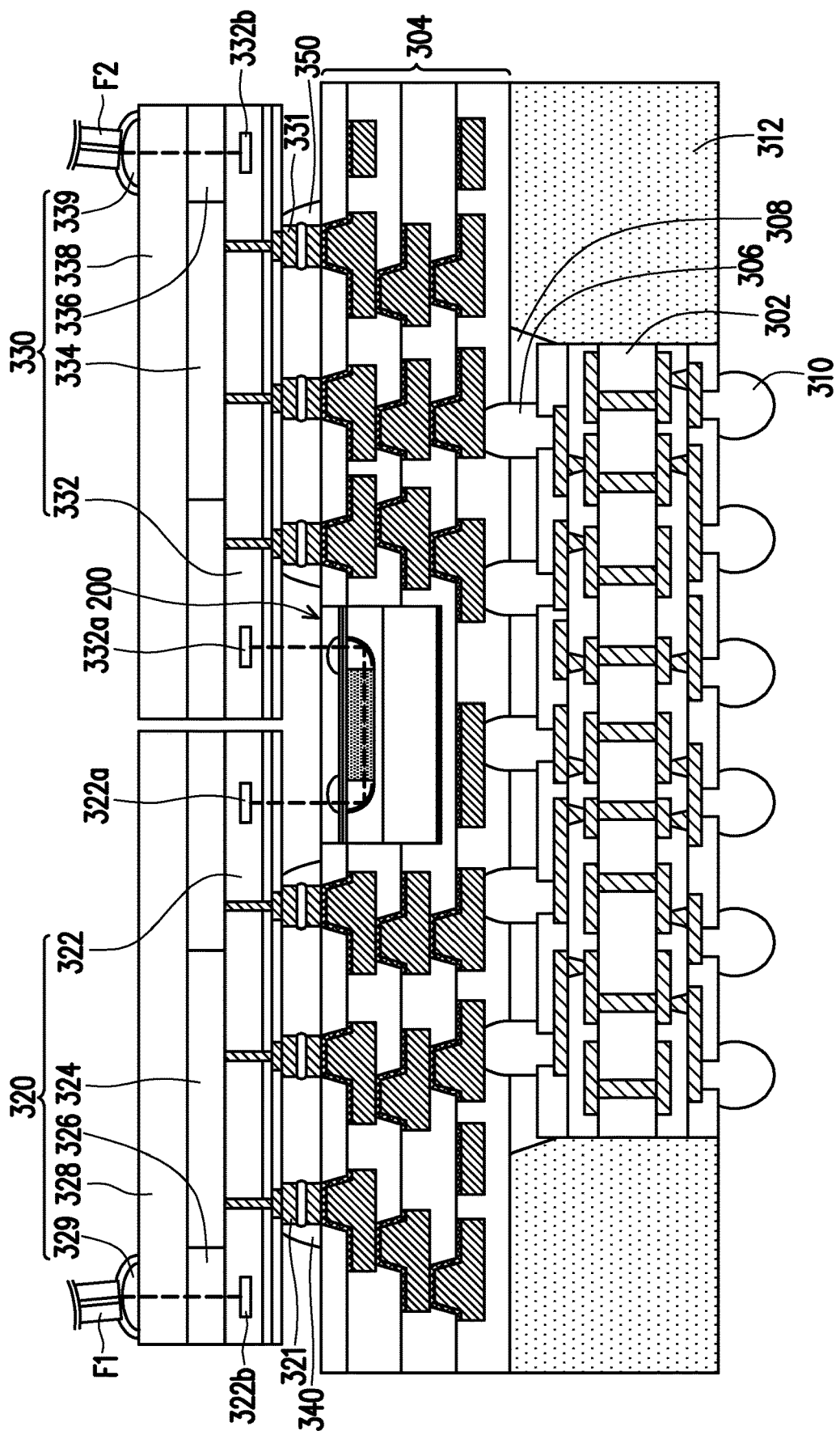

Referring to FIG. 5 and FIG. 6, conductive terminals 314 are formed on the redistribution circuit structure 304. The conductive terminals 314 may be or include conductive bumps or conductive pads electrically connected to redistribution wirings of the redistribution circuit structure 304. As illustrated in FIG. 6, a first system on integrated circuit (SoIC) die 320 and a second SoIC die 330 are provided and mounted on the redistribution circuit structure 304. The first SoIC die 320 and the second SoIC die 330 are electrically connected to the redistribution circuit structure 304 through the conductive terminals 314. Furthermore, the first SoIC die 320 is optically communicated between the optical interconnect structure 200 and an optical fiber F1, and the second SoIC die 330 is optically communicated between the optical interconnect structure 200 and an optical fiber F2. Furthermore, the first SoIC die 320 and the second SoIC die 330 are optically communicated with each other through the optical interconnect structure 200 embedded in the redistribution circuit structure 304.

The first SoIC die 320 may include a photoelectric die 322, an electric die 324, an insulating encapsulation 326, a support substrate 328, and a lens 329. The photoelectric die 322 includes conductive terminals 321, and the conductive terminals 321 of the photoelectric die 322 are electrically connected to the redistribution circuit structure 304 through the conductive terminals 314. The photoelectric die 322 may include an optical input/output (I/O) port 322a and an I/O port 322b. The optical I/O port 322a is optically communicated with the optical interconnect structure 200, and the optical I/O port 322b is optically communicated with the fiber F1. The photoelectric die 322 not only transmit and process electrical data, but also transmit and process optical data. The electric die 324 is stacked over and electrically connected to the photoelectric die 322 to transmit and process electrical data. The insulating encapsulation 326 is disposed on the photoelectric die 322 and laterally encapsulates the electric die 324. The support substrate 328 is disposed over the electric die 324 and the insulating encapsulation 326. In other words, the electric die 324 and the insulating encapsulation 326 are sandwiched between the support substrate 328 and the photoelectric die 322. The lens 329 is formed over the support substrate 328 for facilitating optical coupling efficiency between the fiber F1 and the optical I/O port 322b of the photoelectric die 322. Furthermore, an underfill 340 is formed between the photoelectric die 320 and the redistribution circuit structure 304 so as to laterally encapsulate the conductive terminals 314 and the conductive terminals 321. Accordingly, the reliability of electrical connection (i.e., the conductive terminals 314 and the conductive terminals 321) between the first SoIC die 320 and the redistribution circuit structure 304 may be enhanced by the underfill 340.

The second SoIC die 330 may include a photoelectric die 332, an electric die 334, an insulating encapsulation 336, a support substrate 338, and a lens 339. The photoelectric die 332 includes conductive terminals 331, and the conductive terminals 331 of the photoelectric die 332 are electrically connected to the redistribution circuit structure 304 through the conductive terminals 314. The photoelectric die 332 may include an optical input/output (I/O) port 332a and an I/O port 332b. The optical I/O port 332a is optically communicated with the optical interconnect structure 200, and the optical I/O port 332b is optically communicated with the fiber F2. The photoelectric die 332 not only transmit and process electrical data, but also transmit and process optical data. The electric die 334 is stacked over and electrically connected to the photoelectric die 332 to transmit and process electrical data. The insulating encapsulation 336 is disposed on the photoelectric die 332 and laterally encapsulates the electric die 334. The support substrate 338 is disposed over the electric die 334 and the insulating encapsulation 336. In other words, the electric die 334 and the insulating encapsulation 336 are sandwiched between the support substrate 338 and the photoelectric die 332. The lens 339 is formed over the support substrate 338 for facilitating optical coupling efficiency between the fiber F2 and the optical I/O port 332b of the photoelectric die 332. Furthermore, an underfill 350 is formed between the photoelectric die 330 and the redistribution circuit structure 304 so as to laterally encapsulate the conductive terminals 314 and the conductive terminals 331. Accordingly, the reliability of electrical connection (i.e., the conductive terminals 314 and the conductive terminals 331) between the second SoIC die 330 and the redistribution circuit structure 304 may be enhanced by the underfill 350.

In some other embodiments, the above-mentioned SoIC die 320 and SoIC die 330 may be replaced by multiple photoelectric dies arranged in side-by-side manner, and optical communication between the photoelectric dies may be efficiently achieved by the optical interconnect structure 200. In some other embodiments, the above-mentioned integrated substrate 300 may be replaced by an integrated fanout package including a redistribution circuit structure, wherein a cavity for accommodating an optical interconnect structure is formed in the redistribution circuit structure of the integrated fanout package.

In the above-mentioned embodiments, the integrated substrate 300 including the optical interconnect structure embedded therein may electrically and optically process the data efficiently. Accordingly, the integrated substrate 300 may miniaturize package size and enhance data transmission rate of the package structure.

According to some embodiments, an optical interconnect structure including a base substrate, an optical waveguide, a first reflector, a second reflector, a dielectric layer, a first lens, and a second lens is provided. The optical waveguide is embedded in the base substrate. The optical waveguide includes a first end portion and a second end portion opposite to the first end portion. The first reflector is disposed between the base substrate and the first end portion of the optical waveguide. The second reflector is disposed between the base substrate and the second end portion of the optical waveguide. The dielectric layer covers the base substrate and the optical waveguide. The first lens is disposed on the dielectric layer and located above the first end portion of the optical waveguide. The second lens is disposed on the dielectric layer and located above the second end portion of the optical waveguide. In some embodiments, the base substrate includes a semiconductor substrate and a base dielectric layer disposed on a first surface of the semiconductor substrate. In some embodiments, the optical waveguide is embedded in the base dielectric layer. In some embodiments, the optical waveguide is spaced apart from the semiconductor substrate by the base dielectric layer. In some embodiments, the optical interconnect structure further includes an adhesive layer disposed on a second surface of the semiconductor substrate, and the second surface is opposite to the first surface. In some embodiments, the optical waveguide further includes a guiding portion embedded in the base substrate, and the guiding portion is between the first end portion and the second end portion. In some embodiments, a material of the guiding portion is different from a material of the first end portion and the second end portion. In some embodiments, the optical interconnect structure further includes a protection layer covering the dielectric layer, the first lens and the second lens.

According to some other embodiments, a package structure including a redistribution circuit structure and an optical interconnect structure is provided. The redistribution circuit structure includes a cavity. The optical interconnect structure is disposed in the cavity of the redistribution circuit structure. The optical interconnect structure includes a base substrate, an optical waveguide, a first reflector, a second reflector, a dielectric layer, a first lens, and a second lens. The optical waveguide is embedded in the base substrate. The optical waveguide includes a first end portion and a second end portion opposite to the first end portion. The first reflector is disposed between the base substrate and the first end portion of the optical waveguide. The second reflector is disposed between the base substrate and the second end portion of the optical waveguide. The dielectric layer covers the base substrate and the optical waveguide. The first lens is disposed on the dielectric layer and located above the first end portion of the optical waveguide. The second lens is disposed on the dielectric layer and located above the second end portion of the optical waveguide. In some embodiments, the base substrate includes a semiconductor substrate and a base dielectric layer disposed on the semiconductor substrate. In some embodiments, the optical waveguide is embedded in the base dielectric layer, and a maximum thickness of the optical waveguide is less than a thickness of the base dielectric layer. In some embodiments, the first reflector includes a first curved reflective surface in contact with the first end portion, and the second reflector includes a second curved reflective surface in contact with the second end portion. In some embodiments, the optical interconnect structure further includes an adhesive layer disposed on the semiconductor substrate, wherein the adhesive layer and the base dielectric layer are disposed on opposite surfaces of the semiconductor substrate, and the semiconductor substrate is adhered to a bottom surface of the cavity. In some embodiments, the optical waveguide further includes a guiding portion embedded in the base dielectric layer, and the guiding portion is between the first end portion and the second end portion. In some embodiments, a material of the guiding portion is different from a material of the first end portion and the second end portion. In some embodiments, the optical waveguide further includes a protection layer covering the dielectric layer, the first lens and the second lens, wherein a top surface of the protection layer substantially levels a top surface of the redistribution circuit structure.

According to some embodiments, a method including the following steps is provided. A recess is formed in a base dielectric layer, wherein the recess includes curved sidewalls. A first reflector and a second reflector are formed on the curved sidewalls. An optical waveguide is formed in the recess, wherein the optical waveguide covers the first reflector and the second reflector, and a top surface of the optical waveguide substantially levels with a top surface of the base dielectric layer. A dielectric layer is formed on the top surface of the optical waveguide and the top surface of the base dielectric layer. A first lens and a second lens are formed on the dielectric layer, wherein the first lens is located above the first reflector, and the second lens is located above the second reflector. In some embodiments, the recess in the base dielectric layer is formed by a lithography process using a grey tone mask. In some embodiments, formation of the first reflector and the second reflector includes following steps: forming a patterned photoresist layer on the base dielectric layer, wherein the curved sidewalls are revealed by the patterned photoresist layer; forming a reflective material layer covering the curved sidewalls and the patterned photoresist layer; and removing the patterned photoresist layer and portions of the reflective material layer formed in the patterned photoresist layer. In some embodiments, formation of the optical wave guide in the recess includes following steps: forming an optical material layer covering the first reflector, the second reflector, and the base dielectric layer; and removing the optical material layer until the top surface of the base dielectric layer is revealed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   forming a recess in a base dielectric layer, wherein the recess comprises curved sidewalls;
   forming a first reflector and a second reflector on the curved sidewalls;
   forming an optical waveguide in the recess, wherein the optical waveguide covers the first reflector and the second reflector, and a top surface of the optical waveguide substantially levels with a top surface of the base dielectric layer;
   forming a dielectric layer on the top surface of the optical waveguide and the top surface of the base dielectric layer; and
   forming a first lens and a second lens on the dielectric layer, wherein the first lens is located above the first reflector, and the second lens is located above the second reflector,
   wherein forming the first reflector and the second reflector comprises:
   forming a patterned photoresist layer on the base dielectric layer having the recess, wherein the curved sidewalls are revealed by the patterned photoresist layer;
   forming a reflective material layer covering the curved sidewalls and the patterned photoresist layer; and
   removing the patterned photoresist layer and portions of the reflective material layer formed on the patterned photoresist layer.

2. The method of claim 1, wherein the recess in the base dielectric layer is formed by a lithography process using a grey tone mask.

3. The method of claim 1, wherein the patterned photoresist layer is formed on the base dielectric layer to cover the bottom surface of the recess and the top surface of the base dielectric layer.

4. The method of claim 1, wherein forming the optical wave guide in the recess comprises:
   forming an optical material layer covering the first reflector, the second reflector, and the base dielectric layer; and
   removing the optical material layer until the top surface of the base dielectric layer is revealed.

5. A structure, comprising:
a circuit substrate;
an insulating encapsulation laterally encapsulating the circuit substrate;
a redistribution circuit structure disposed on the circuit substrate and the insulating encapsulation, wherein the redistribution circuit structure comprises a cavity; and
an optical interconnect structure placing in the cavity, comprising:
a base substrate, comprising:
a semiconductor substrate; and
a base dielectric layer disposed on a first surface of the semiconductor substrate;
an optical waveguide embedded in the base substrate, the optical waveguide comprising a first end portion, a second end portion opposite to the first end portion, and a guiding portion embedded in the base substrate, and the guiding portion is between the first end portion and the second end portion, and wherein an interface is formed between the guiding portion and the first end portion;
a first reflector disposed between the base substrate and the first end portion of the optical waveguide, wherein the first reflector is spaced apart from the guiding portion by the first end portion;
a second reflector disposed between the base substrate and the second end portion of the optical waveguide;
a dielectric layer covering the base substrate and the optical waveguide;
a first lens disposed on the dielectric layer and located above the first end portion of the optical waveguide;
a second lens disposed on the dielectric layer and located above the second end portion of the optical waveguide; and
an adhesive layer disposed on a second surface of the semiconductor substrate, wherein the second surface is opposite to the first surface,
wherein the optical interconnect structure is adhered to a bottom surface of the cavity through the adhesive layer.

6. The structure of claim 5, wherein
the first end portion comprises a first surface interfacing the guiding portion and a second surface interfacing the first reflector, and the second end portion comprises a third surface interfacing the guiding portion and a fourth surface interfacing the second reflector.

7. The structure of claim 6, wherein one end of the first surface of the first end portion is in contact with one end of the second surface of the first end portion, and another end of the first surface of the first end portion is away from another end of the second surface of the first end portion.

8. The structure of claim 5, wherein the optical waveguide is spaced apart from the semiconductor substrate by the base dielectric layer.

9. The structure of claim 5 further comprising:
conductive terminals; and
an underfill disposed between the circuit substrate and the redistribution circuit structure, wherein the circuit substrate is electrically connected to the redistribution circuit structure through the conductive terminals laterally encapsulated by the underfill.

10. The structure of claim 5, wherein the second reflector is spaced apart from the guiding portion by the second end portion.

11. The structure of claim 5, wherein a material of the guiding portion is different from a material of the first end portion and the second end portion.

12. The structure of claim 5 further comprising:
a protection layer covering the dielectric layer, the first lens and the second lens.

13. A package structure, comprising:
a redistribution circuit structure comprising a cavity;
an optical interconnect structure disposed in the cavity of the redistribution circuit structure; and
a first die and a second die mounting on the redistribution circuit structure,
wherein the optical interconnect structure comprising:
a base substrate, comprising:
a semiconductor substrate; and
a base dielectric layer disposed on the semiconductor substrate;
an optical waveguide embedded in the base substrate, the optical waveguide comprising a first end portion and, a second end portion opposite to the first end portion, and a guiding portion embedded in the base substrate, and the guiding portion is between the first end portion and the second end portion, and wherein an interface is formed between the guiding portion and the first end portion;
a first reflector disposed between the base substrate and the first end portion of the optical waveguide, wherein the first reflector is spaced apart from the guiding portion by the first end portion;
a second reflector disposed between the base substrate and the second end portion of the optical waveguide;
a dielectric layer covering the base substrate and the optical waveguide;
a first lens disposed on the dielectric layer and located above the first end portion of the optical waveguide;
a second lens disposed on the dielectric layer and located above the second end portion of the optical waveguide; and
an adhesive layer disposed on the semiconductor substrate, the adhesive layer and the base dielectric layer are disposed on opposite surfaces of the semiconductor substrate, and the semiconductor substrate is adhered to a bottom surface of the cavity.

14. The package structure of claim 13, wherein
the first end portion comprises a first surface interfacing the guiding portion and a second surface interfacing the first reflector, and the second end portion comprises a third surface interfacing the guiding portion and a fourth surface interfacing the second reflector.

15. The package structure of claim 13, wherein the optical waveguide is embedded in the base dielectric layer, and a maximum thickness of the optical waveguide is less than a thickness of the base dielectric layer.

16. The package structure of claim 13, wherein the first reflector comprises a first curved reflective surface in contact with the first end portion, and the second reflector comprises a second curved reflective surface in contact with the second end portion.

17. The package structure of claim 13, wherein the first die comprises conductive terminals, and the conductive terminals are electrically connected to the redistribution circuit structure.

18. The package structure of claim 13, wherein the second reflector is spaced apart from the guiding portion by the second end portion.

19. The package structure of claim 13, wherein a material of the guiding portion is different from a material of the first end portion and the second end portion.

20. The package structure of claim 13, wherein the optical waveguide further comprises:

a protection layer covering the dielectric layer, the first lens and the second lens, and a top surface of the protection layer substantially levels a top surface of the redistribution circuit structure.

* * * * *